(12) United States Patent
Kazuno et al.

(10) Patent No.: US 10,054,915 B2
(45) Date of Patent: Aug. 21, 2018

(54) APPARATUS CONTROL DEVICE, APPARATUS CONTROL SYSTEM AND METHOD FOR CONTROLLING APPARATUS FOR CONTROLLING AN OPERATION OF AN INTENDED APPARATUS IN ACCORDANCE WITH A CONTROL SCHEDULE

(71) Applicant: PANASONIC INTELLECTUAL PROPERTY MANAGEMENT CO., LTD., Osaka (JP)

(72) Inventors: Hiroki Kazuno, Osaka (JP); Toshiaki Nakao, Osaka (JP); Tomoya Sogo, Osaka (JP); Yoshifumi Murakami, Osaka (JP); Toru Shimotsuma, Osaka (JP); Ryuichi Maeda, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 372 days.

(21) Appl. No.: 14/412,399

(22) PCT Filed: Jun. 26, 2013

(86) PCT No.: PCT/JP2013/004012
§ 371 (c)(1),
(2) Date: Dec. 31, 2014

(87) PCT Pub. No.: WO2014/006859
PCT Pub. Date: Jan. 9, 2014

(65) Prior Publication Data
US 2015/0185720 A1    Jul. 2, 2015

(30) Foreign Application Priority Data

Jul. 5, 2012 (JP) ................. 2012-151691

(51) Int. Cl.
G05B 15/02 (2006.01)
G08C 17/00 (2006.01)
F24F 11/46 (2018.01)

(52) U.S. Cl.
CPC .............. *G05B 15/02* (2013.01); *F24F 11/46* (2018.01); *G08C 17/00* (2013.01);
(Continued)

(58) Field of Classification Search
CPC ............ G05B 15/02; G05B 2011/0075; G05B 2219/2613–2219/2615; G05B 2219/2638;
(Continued)

(56) References Cited

U.S. PATENT DOCUMENTS 7,392,661 B2 * 7/2008 Alles ..................... F24F 3/0442
236/94
8,214,061 B2 * 7/2012 Westrick, Jr. ........ H05B 37/0218
315/312
(Continued)

FOREIGN PATENT DOCUMENTS

JP     2001-218367 A    8/2001
JP     2001-244083 A    9/2001
(Continued)

OTHER PUBLICATIONS

International Search Report issued International Application No. PCT/JP2013/004012 dated Jul. 30, 2013, with English Translation.

*Primary Examiner* — Todd Aguilera
(74) *Attorney, Agent, or Firm* — McDermott Will & Emery LLP

(57) ABSTRACT

The obtainment unit obtains information indicative of a content of manual-operation performed by a user regarding control of an intended apparatus from a group of loads, and stores it as manual-operation information including an obtaining time. The identification unit identifies a type of
(Continued)

control of the manual-operation information. The determination unit counts the number of times of obtaining the manual-operation information within a counting period equal to two days or more, for each type and for each time period, and determines whether the number of times of obtaining the same type of manual-operation information within the same time period is equal to a predetermined threshold or more. When the number of times of obtaining the same type of manual-operation information within the same time period is determined to be equal to the predetermined threshold or more, the schedule change unit changes a control schedule based on this manual-operation information.

15 Claims, 19 Drawing Sheets

(52) U.S. Cl.
CPC .............. G05B 2219/23077 (2013.01); G05B 2219/25419 (2013.01); G05B 2219/2642 (2013.01); Y02B 20/42 (2013.01)

(58) Field of Classification Search
CPC .... G05B 2219/2642; G05B 2219/2648; G05B 2219/23077; G05B 2219/25419; Y02B 20/42; F24F 2011/0036; F24F 2011/0057; F24F 2011/0073; F24F 2011/0075; F24F 11/30; F24F 11/46; F24F 11/48; F24F 11/62–11/64; F24F 2120/00; F24F 2120/20; G08C 17/00
USPC ................................ 700/11, 12, 14, 19, 276
See application file for complete search history.

(56) References Cited

U.S. PATENT DOCUMENTS

| | | | |
|---|---|---|---|
| 2005/0194455 A1* | 9/2005 | Alles ..................... | F24F 3/0442 236/1 B |
| 2007/0273307 A1* | 11/2007 | Westrick ............ | H05B 37/0218 315/312 |
| 2010/0076613 A1 | 3/2010 | Imes | |
| 2011/0015802 A1 | 1/2011 | Imes | |
| 2011/0016018 A1 | 1/2011 | Smith et al. | |
| 2011/0046792 A1 | 2/2011 | Imes et al. | |
| 2011/0046798 A1 | 2/2011 | Imes et al. | |
| 2011/0046799 A1 | 2/2011 | Imes et al. | |
| 2011/0046800 A1 | 2/2011 | Imes et al. | |
| 2011/0046801 A1 | 2/2011 | Imes et al. | |
| 2011/0051823 A1 | 3/2011 | Imes et al. | |
| 2011/0054699 A1 | 3/2011 | Imes et al. | |
| 2011/0054710 A1 | 3/2011 | Imes et al. | |
| 2011/0172792 A1* | 7/2011 | Shinohara .............. | G06Q 50/06 700/90 |
| 2011/0172835 A1 | 7/2011 | Imes | |
| 2011/0173542 A1 | 7/2011 | Imes et al. | |
| 2011/0202185 A1 | 8/2011 | Imes et al. | |
| 2011/0214060 A1 | 9/2011 | Imes et al. | |
| 2011/0224838 A1 | 9/2011 | Imes et al. | |
| 2011/0246898 A1 | 10/2011 | Imes et al. | |
| 2011/0307101 A1 | 12/2011 | Imes et al. | |
| 2012/0023225 A1 | 1/2012 | Imes et al. | |
| 2012/0046859 A1 | 2/2012 | Imes et al. | |
| 2012/0064923 A1 | 3/2012 | Imes et al. | |
| 2012/0072033 A1 | 3/2012 | Imes et al. | |
| 2012/0093141 A1 | 4/2012 | Imes et al. | |
| 2012/0101637 A1 | 4/2012 | Imes et al. | |
| 2012/0135759 A1 | 5/2012 | Imes et al. | |
| 2012/0215725 A1 | 8/2012 | Imes et al. | |
| 2012/0221718 A1 | 8/2012 | Imes et al. | |
| 2012/0252430 A1 | 10/2012 | Imes et al. | |
| 2012/0277924 A1* | 11/2012 | Kobayashi ............ | G06Q 10/06 700/291 |
| 2012/0324119 A1 | 12/2012 | Imes et al. | |
| 2013/0060387 A1 | 3/2013 | Imes et al. | |

FOREIGN PATENT DOCUMENTS

| | | | | |
|---|---|---|---|---|
| JP | 2001-306134 A | 11/2001 | | |
| JP | 2005-158020 A | 6/2005 | | |
| JP | 2005-282219 A | 10/2005 | | |
| JP | 2006-155200 A | 6/2006 | | |
| JP | 2007-071405 A | 3/2007 | | |
| JP | 2008-020091 A | 1/2008 | | |
| JP | 2009-085497 A | 4/2009 | | |
| JP | 2009-290475 A | 12/2009 | | |
| JP | WO 2011078155 A1 * | 6/2011 | ............ | G06Q 50/06 |
| JP | 2011-153743 A | 8/2011 | | |
| JP | 2011-166483 A | 8/2011 | | |
| JP | 2011-204201 A | 10/2011 | | |
| JP | 2012-026586 A | 2/2012 | | |
| JP | 2012-115115 A | 6/2012 | | |
| WO | 2011/011404 A1 | 1/2011 | | |

\* cited by examiner

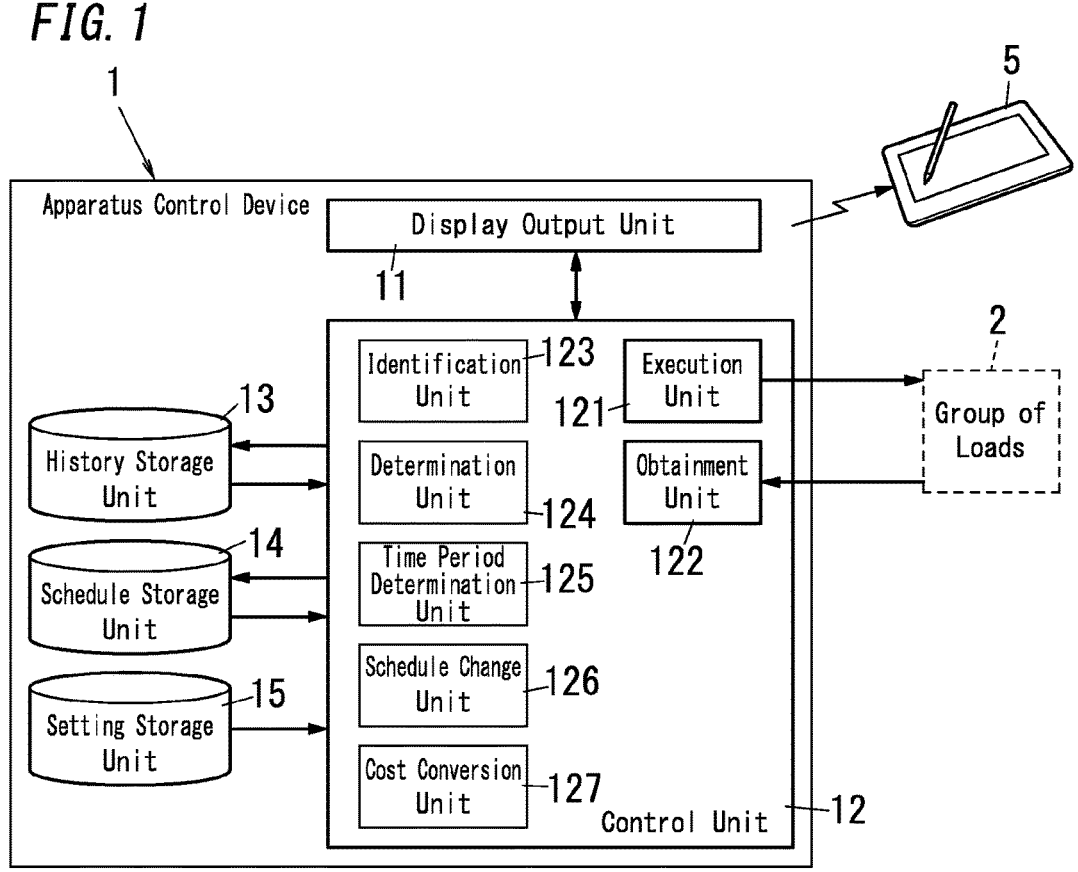
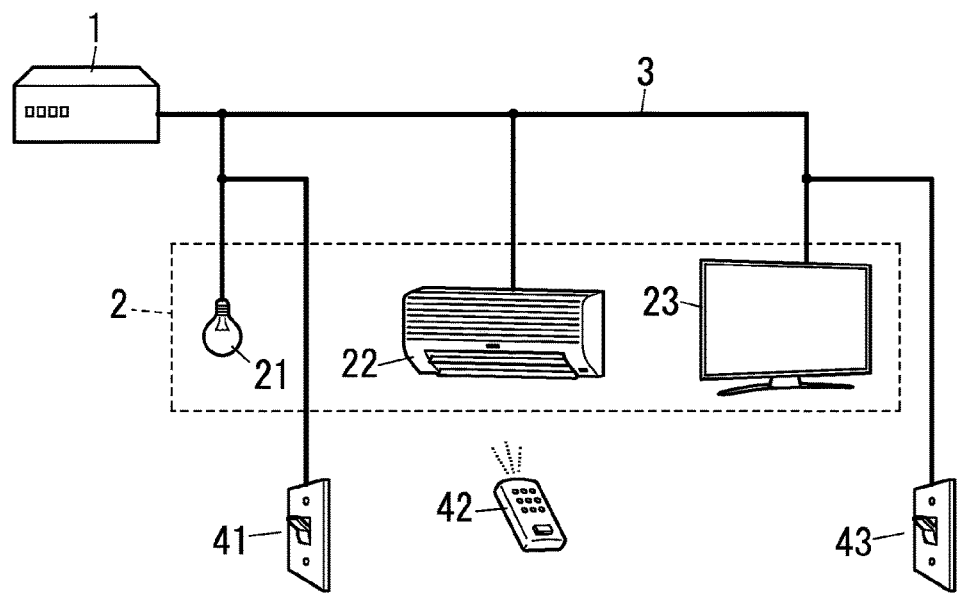

| RECEIVING TIME | TYPE | TERMINAL | MANUAL OPERATION AND CONTROL RESULTS |
|---|---|---|---|
| ⋮ | ⋮ | ⋮ | ⋮ |
| 2011/1/1 19:00 | Control | Lighting 1 | OFF |
| 2011/1/1 19:05 | Manual Operation | Lighting 1 | ON |
| 2011/1/1 19:31 | Manual Operation | Air Conditioner 1 | ON |
| 2011/1/1 21:12 | Manual Operation | Lighting 1 | OFF |
| ⋮ | ⋮ | ⋮ | ⋮ |

| Terminal | Schedule 1 | | Schedule n | | Energy Consumption [kWh] | Predicted Energy [kWh] |
| | ON Control | OFF Control | ON Control | OFF Control | | |
|---|---|---|---|---|---|---|
| Lighting 1 | 10:00 | 19:00 | NULL | NULL | 30 | 123.4 |
| Lighting 2 | 9:30 | 12:30 | 23:30 | 23:30 | 50 | 234.5 |
| ⋮ | ⋮ | ⋮ | ⋮ | ⋮ | ⋮ | ⋮ |
| Air Conditioner 1 | 10:00 | 19:00 | NULL | NULL | 800 | 3456.7 |
| ⋮ | ⋮ | ⋮ | ⋮ | ⋮ | ⋮ | ⋮ |
| Signage 1 | 9:30 | 19:00 | NULL | NULL | 200 | 1567.8 |
| ⋮ | ⋮ | ⋮ | ⋮ | ⋮ | ⋮ | ⋮ |

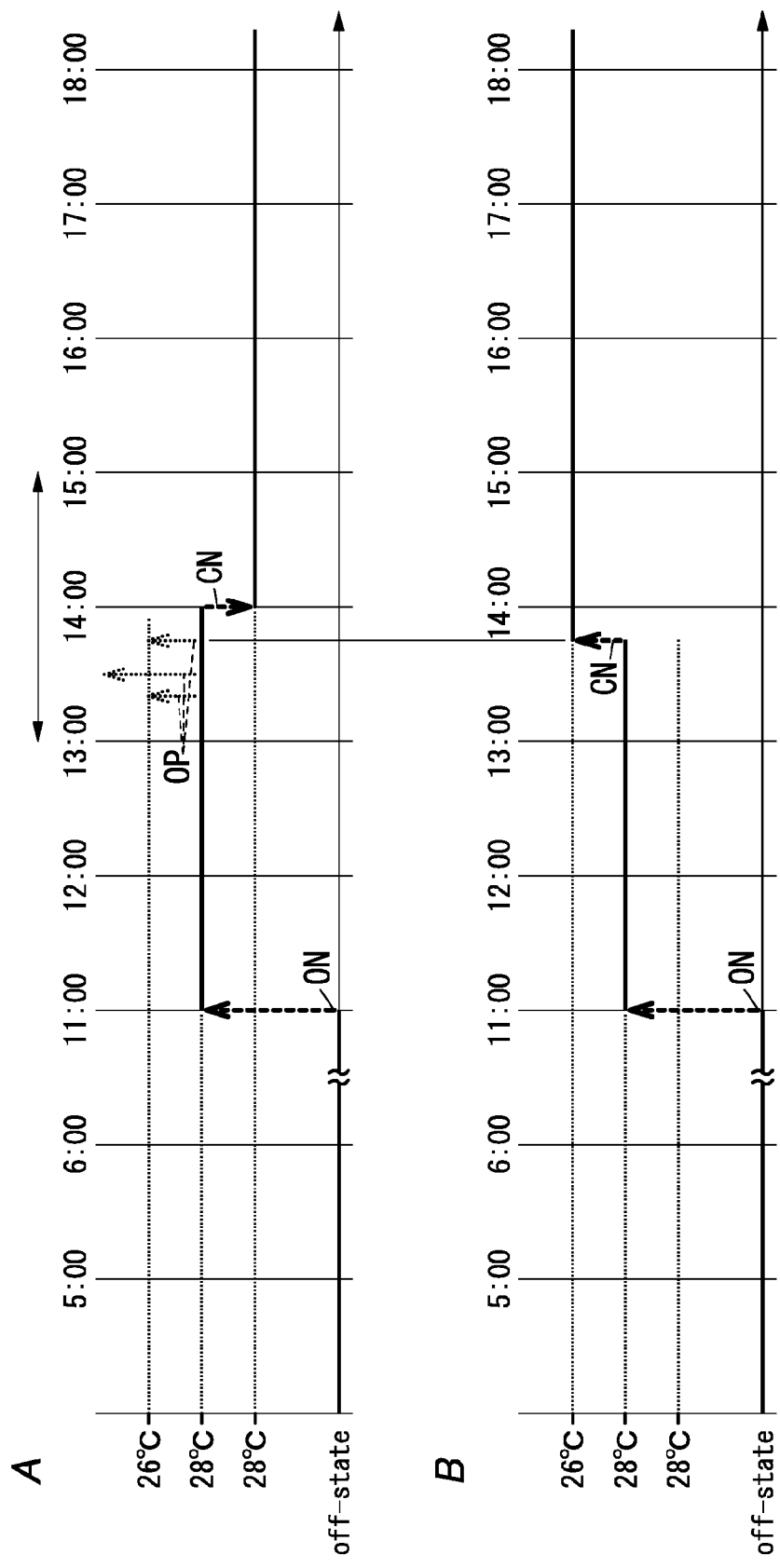

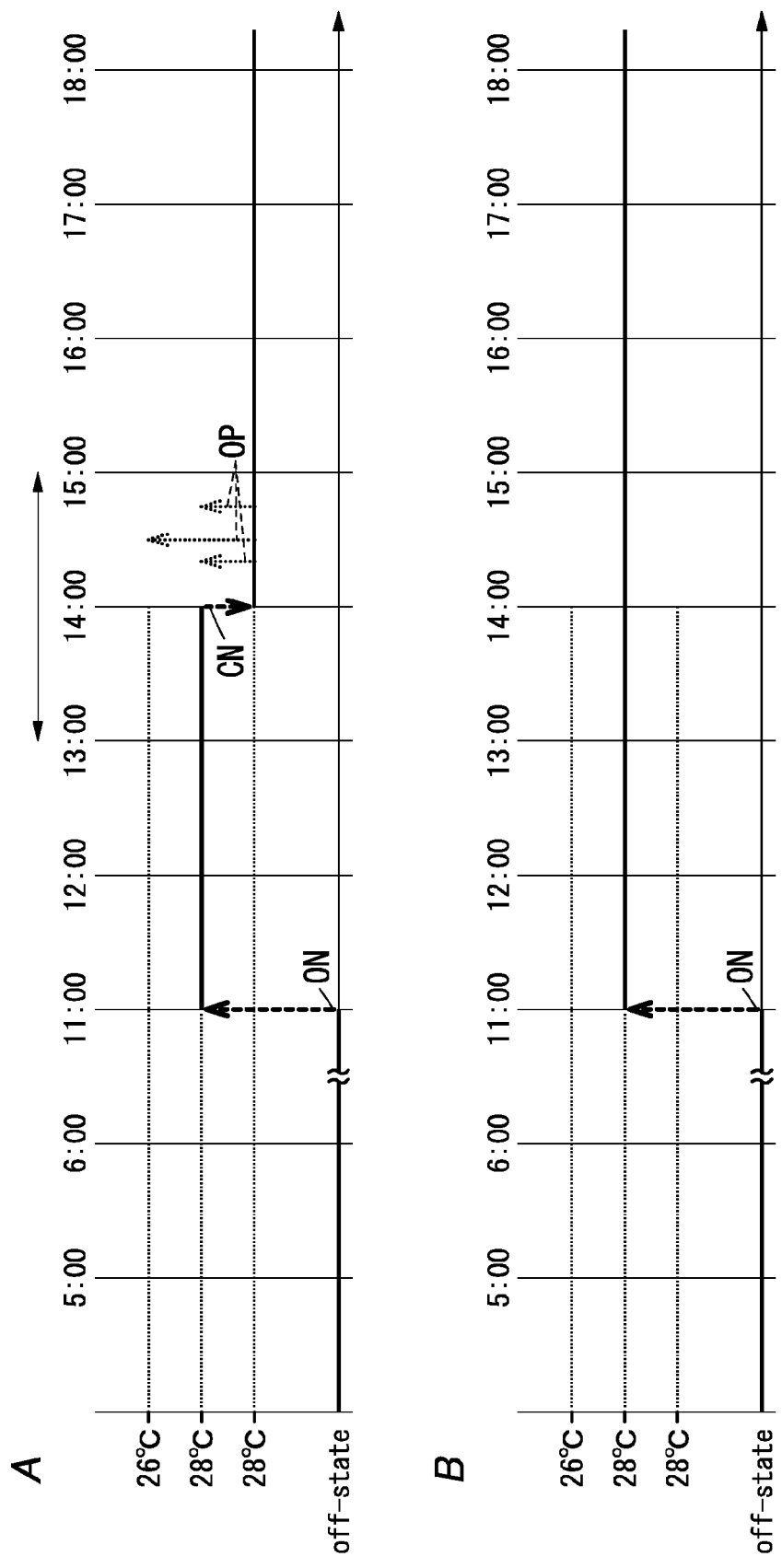

APPARATUS CONTROL DEVICE, APPARATUS CONTROL SYSTEM AND METHOD FOR CONTROLLING APPARATUS FOR CONTROLLING AN OPERATION OF AN INTENDED APPARATUS IN ACCORDANCE WITH A CONTROL SCHEDULE

RELATED APPLICATIONS

This application is a national phase of International Application No. PCT/JP2013/004012, filed on Jun. 26, 2013, which in turn claims the benefit of Japanese Application No. 2012-151691, filed on Jul. 5, 2012 the disclosures of which Applications are incorporated by reference herein.

TECHNICAL FIELD

The present invention relates to an apparatus control device for controlling an operation of an intended apparatus in accordance with a control schedule, an apparatus control system, and a program.

BACKGROUND ART

In the past, there has been proposed an apparatus control device used in office buildings, commercial facilities, and factories (hereinafter, they are referred to as "facilities"). In order to reduce consumptions of resources such as electricity of apparatuses such as lighting fixtures and air conditioners, the apparatus control device operates these apparatuses in accordance with a control schedule preliminarily set. In this type of apparatus control devices, generally, to reduce consumptions of resources of an apparatuses (to achieve energy saving), control schedules which are set suitable for individual facilities by an engineer are used. Therefore, the engineer is required to set (adjust) different control schedules for individual facilities. Therefore, when the engineer needs to install the apparatus control devices in many facilities, strain on the engineer may increase accordingly.

Further, there has been proposed an apparatus control system (air conditioner management system) in which setting of control schedules is simplified and automated (document 1: JP 2007-71405 A). The apparatus control system disclosed in document 1 stores operation setting contents indicative of manual-operation of air conditioners by users in association with time, as history information, and sets (creates) control schedules on the basis of the history information automatically. Consequently, the apparatus control system repeats contents of actual manual-operations performed by users.

In the apparatus control system disclosed in document 1, when a user presses a schedule creation button, an automation process of schedule creation starts. Further, document 1 discloses that a user can change time setting and operation setting by pressing setting change buttons on schedule change screens.

However, in the apparatus control system of document 1, once the control schedule is set, the control schedule is not changed until a user presses the schedule creation buttons to reset the control schedule or changes the control schedule with the schedule change screen. This apparatus control system can repeat contents of actual manual-operations performed by users. However, in contrast to a case of controlling apparatuses in accordance with a control schedule set suitable for an individual facility by an engineer, this apparatus control system cannot provide sufficient effects in reducing consumptions of resources. For example, if waste consumptions of resources occur due to forgetting to turn off apparatuses before the process of creating the control schedule, thereafter the apparatus control system repeats contents of manual-operations performed by users reflecting forgetting to turn off apparatuses. Consequently, waste consumptions of resources occur repeatedly, and reduction in consumptions of resources cannot be achieved.

SUMMARY OF INVENTION

In view of the above insufficiency, the present invention has aimed to propose an apparatus control device, an apparatus control system, and a program which are capable of reducing a consumption of resources of an apparatus without imposing a great strain on an engineer.

The apparatus control device of the first aspect in accordance with the present invention is an apparatus control device for controlling an operation of an intended apparatus which consumes resources to operate. The apparatus control device includes: a schedule storage unit configured to store a control schedule including multiple control commands each defining a pair of a control time and a control content associated with each other; an execution unit configured to control the intended apparatus at a control time used in the control schedule stored in the schedule storage unit, in accordance with the control content associated with this control time; an obtainment unit configured to obtain manual-operation information indicative of a content of a manual-operation conducted by a user and a time at which the manual-operation is conducted with regard to control on the intended apparatus; an identification unit configured to identify a type of control of the manual-operation information obtained by the obtainment unit; a determination unit configured to count the number of times of obtaining the manual-operation information within a counting period equal to two days or more, for each type identified by the identification unit and for each of multiple time periods into which a day is divided, and determine whether the number of times of obtaining the same type of the manual-operation information within the same time period is equal to a predetermined threshold or more; and a schedule change unit configured to, when the number of times of obtaining the same type of manual-operation information within the same time period is determined to be equal to the predetermined threshold or more by the determination unit, change the control schedule on the basis of this manual-operation information.

In the apparatus control device of the second aspect in accordance with the present invention which is realized in combination with the first aspect, the determination unit has a function of setting lengths of the multiple time periods used in determination.

In the apparatus control device of the third aspect in accordance with the present invention which is realized in combination with the first or second aspect, the schedule change unit is configured to, when the number of times of obtaining the same type of manual-operation information within the same time period is determined to be equal to the predetermined threshold or more by the determination unit and when this time period is included in a monitoring period decided on the basis of the control time associated with the control content of the same type as this manual-operation information to be constituted by at least one of predetermined time periods prior to and subsequent to this control time, change the control time as the basis of this monitoring period, in accordance with the manual-operation information.

In the apparatus control device of the fourth aspect in accordance with the present invention which is realized in combination with any one of the first to third aspects, the schedule change unit is configured to, when the number of times of obtaining the same type of manual-operation information within the same time period is determined to be equal to the predetermined threshold or more by the determination unit and when this time period is not included in a monitoring period decided on the basis of the control time associated with the control content of the same type as this manual-operation information to be constituted by at least one of predetermined time periods prior to and subsequent to this control time, add a new control command to the control schedule on the basis of the manual-operation information.

In the apparatus control device of the fifth aspect in accordance with the present invention which is realized in combination with the third or fourth aspect, the schedule change unit is configured to, when, with regard to two or more types of the manual-operation information, the number of times of obtaining the same type of manual-operation information within the same time period is determined to be equal to the predetermined threshold or more by the determination unit, use preferentially the manual-operation information of the same type as the control content associated with the control time used as the basis of the monitoring period, for change of the control schedule.

In the apparatus control device of the sixth aspect in accordance with the present invention which is realized in combination with any one of the first to fifth aspects, the schedule change unit is configured to, when the number of times of obtaining the same type of the manual-operation information within the same time period is determined to be equal to the predetermined threshold or more by the determination unit, change the control schedule on the basis of the manual-operation information obtained at a time which is the smallest in a consumption of the resources of times at which pieces of the same type of the manual-operation information are obtained.

In the apparatus control device of the seventh aspect in accordance with the present invention which is realized in combination with any one of the first to sixth aspects, the determination unit is configured to use different values as the threshold according to different types of the manual-operation information. A value of the threshold corresponding to the manual-operation information for decreasing a consumption of the resources is lower than a value of the threshold corresponding to the manual-operation information for increasing a consumption of the resources.

The apparatus control device of the eighth aspect in accordance with the present invention which is realized in combination with any one of the first to seventh aspects, further includes: a cost conversion unit configured to convert a consumption of the resources into a cost; and a display output unit configured to display at least one of the consumption of the resources in a case where the intended apparatus is controlled in accordance with the control schedule, and the cost obtained into which the consumption is converted by the cost conversion unit.

In the apparatus control device of the ninth aspect in accordance with the present invention which is realized in combination with any one of the first to eighth aspects, the schedule change unit is configured to present a candidate of a post-changed control schedule in a process of changing the control schedule, and to finally decide change to this control schedule in response to manual input from a user.

The apparatus control system in accordance with the present invention includes: the apparatus control device according to any one of the first to ninth aspects; and multiple apparatuses each configured to consume the resources to operate. The apparatus control device is configured to treat each of the multiple apparatuses as an intended apparatus and to control operations of the multiple apparatuses.

The program in accordance with the present invention is a program for allowing a computer to function as an apparatus control device including: a schedule storage unit configured to store a control schedule including multiple control commands each defining a pair of a control time and a control content associated with each other; an execution unit configured to control an intended apparatus at a control time used in the control schedule stored in the schedule storage unit, in accordance with the control content associated with this control time; an obtainment unit configured to obtain manual-operation information indicative of a content of a manual-operation conducted by a user and a time at which the manual-operation is conducted with regard to control on the intended apparatus; an identification unit configured to identify a type of control of the manual-operation information obtained by the obtainment unit; a determination unit configured to count the number of times of obtaining the manual-operation information within a counting period equal to two days or more, for each type identified by the identification unit and for each of multiple time periods into which a day is divided, and determine whether the number of times of obtaining the same type of the manual-operation information within the same time period is equal to a predetermined threshold or more; and a schedule change unit configured to, when the number of times of obtaining the same type of manual-operation information within the same time period is determined to be equal to the predetermined threshold or more by the determination unit, change the control schedule based on this manual-operation information.

BRIEF DESCRIPTION OF DRAWINGS

FIG. 1 is a block diagram illustrating a configuration of an apparatus control device in accordance with the embodiment 1.

FIG. 2 is a schematic diagram illustrating a configuration of an apparatus control system in accordance with the embodiment 1.

FIG. 3 is an explanatory view illustrating a history table used in the apparatus control device in accordance with the embodiment 1.

FIG. 4 is an explanatory view illustrating a control table used in the apparatus control device in accordance with the embodiment 1.

FIG. 20 is an explanatory view illustrating an operation example of the apparatus control device in accordance with the embodiment 2.

FIG. 21 is an explanatory view illustrating an operation example of the apparatus control device in accordance with the embodiment 2.

DESCRIPTION OF EMBODIMENTS

Figure 5:
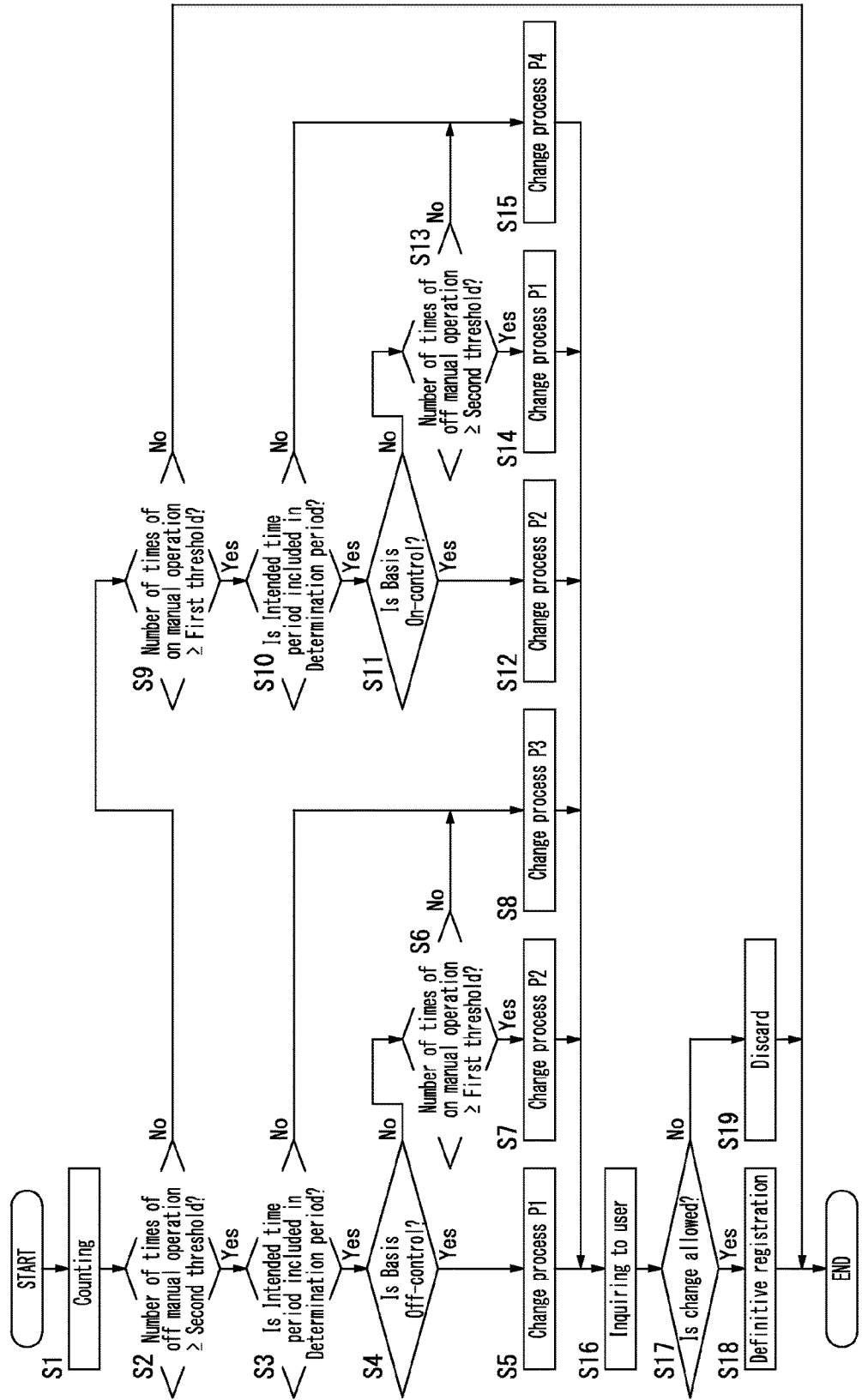
FIG. 5 is a flow chart illustrating an operation of the apparatus control device in accordance with the embodiment 1.

The following description is made to an example in which an apparatus control system is used in premises of commercial facilities such as a supermarket. However, such an apparatus control system is not limited to being used in commercial facilities but may be used in facilities such as office buildings and factories. Further, in the following description, resources consumed when intended apparatuses operate are exemplified by electricity. However, the intended apparatuses may be an apparatus configured to consume resources such as water, gas, and heat other than electricity to operate.

Embodiment 1

An apparatus control device 1 (see FIG. 1), of the present embodiment controls operations of intended apparatuses 21, 22, and 23 (see FIG. 2), which consume resources to operate. As shown in FIG. 1, this apparatus control device 1 includes a schedule storage unit 14, an execution unit 121, an obtainment unit 122, an identification unit 123, a determination unit 124, and a schedule change unit 126. The schedule storage unit 14 is configured to store a control schedule including multiple control commands each defining a pair of a control time and a control content associated with each other. The execution unit 121 is configured to control the intended apparatus 21, 22, or 23 at a control time used in the control schedule stored in the schedule storage unit 14, in accordance with the control content associated with this control time. The obtainment unit 122 is configured to obtain manual-operation information indicative of a content of a manual-operation conducted by a user and a time at which the manual-operation is conducted with regard to control on the intended apparatus 21, 22, or 23. The identification unit 123 is configured to identify a type of control of the manual-operation information obtained by the obtainment unit 122.

The determination unit 124 is configured to count the number of times of obtaining the manual-operation information within a counting time period equal to two days or more, for each type identified by the identification unit 123 and for each of multiple time periods into which a day is divided, and determine whether the number of times of obtaining the same type of the manual-operation information within the same time period is equal to a predetermined threshold or more. The schedule change unit 126 is configured to, when the number of times of obtaining the same type of manual-operation information within the same time period is determined to be equal to the predetermined threshold or more by the determination unit 124, change the control schedule on the basis of this manual-operation information.

The program in accordance with the present embodiment is a program allowing a computer to function as the apparatus control device 1.

The apparatus control system of the present embodiment includes the apparatus control device 1 and multiple apparatuses configured to consume resources to operate. The apparatus control device 1 is configured to acknowledge each of these apparatuses as the intended apparatus 21, 22, 23 and to control operations of the multiple apparatuses. In the example shown in FIG. 2, the intended apparatus 21 is a lighting fixture, and the intended apparatus 22 is an air conditioner, and the intended apparatus 23 is an image display such as a digital signage. These intended apparatuses 21, 22, and 23 consume electricity (electric energy), to operate. Note that, these multiple intended apparatuses 21, 22, and 23 constitute a group of loads 2.

The apparatus control device 1 is connected to each of the intended apparatuses 21, 22, and 23 via a connection line 3, and can at least switch each of the intended apparatuses 21, 22, and 23 between an on-state and off-state by communicating with each of the intended apparatuses 21, 22, and 23 via a connection line 3. Further, the apparatus control device 1 can identify the operation-state (at least, the on-state and off-state), of each of the intended apparatuses 21, 22, and 23 through communication with each of the intended apparatuses 21, 22, and 23. Note that, in the present embodiment, communication between the apparatus control device 1 and each of the intended apparatuses 21, 22, and 23 is wired communication using the connection line 3 as a communication line, but is not limited to this and may be wireless communication (including optical communication). Alternatively, by use of power line communication techniques, the connection line 3 may serve as both a power line and a communication line, or a power line and a communication line may be provided as individual lines.

When at least an operation-state is changed, each of the intended apparatuses 21, 22, and 23 reports a post-changed operation-state to the apparatus control device 1. With regard to each of the intended apparatuses 21, 22, and 23, the operation-state is controlled by the apparatus control device 1, and additionally is changed in response to manual-operation of a user. In summary, when a user conducts manual-operation on one of wall switches 41 and 43 connected to the connection line 3 and an infrared remote control transmitter 42, a corresponding one of the intended apparatuses 21, 22, and 23 changes its operation-state in response to a content of the manual-operation, and reports the post-changed operation-state to the apparatus control device 1.

The apparatus control device 1 is configured to, when the operation-state of one of the intended apparatuses 21, 22, and 23 is changed, determine whether this change is caused by the intended apparatus itself, or manual-operation of a user. The change of the operation-state identified by the apparatus control device 1 is not limited to switch between the on-state and the off-state, but may be increase or decrease in a dimming level in a case of the intended apparatus 21 serving as the lighting fixture, or increase or decrease in a desired temperature in a case of the intended apparatus 22 serving as the air conditioner. However, in the present embodiment, for concise explanation, it is assumed that the operation-state of each of the intended apparatuses 21, 22, and 23 may include two states which are the on-state and the off-state.

Hereinafter, a detailed configuration of the apparatus control device 1 is described with reference to FIG. 1.

The apparatus control device 1 includes a display output unit 11, a control unit 12, a history storage unit 13, the aforementioned schedule storage unit 14, and a setting storage unit 15. In the present embodiment, the apparatus control device 1 is realized by use of a computer, and executing a program stored in a memory to function as the display output unit 11, the control unit 12, the history storage unit 13, the schedule storage unit 14, and the setting storage unit 15.

The display output unit 11 outputs information such as the state of the apparatus control device 1, history information (described later), stored in the history storage unit 13, and setting information (described later), stored in the setting storage unit 15 to a display terminal 5 so as to allow the display terminal 5 to display the information. In this regard, the display terminal 5 is a user interface such as a tablet terminal and a smartphone, for example. The display terminal 5 establishes wired communication or wireless communication with the display output unit 11 of the apparatus control device 1 and thereby display information received from the apparatus control device 1. Note that, communication between the display output unit 11 and the display terminal 5 may be realized by use of the Ethernet (registered trademark), or may be realized by another communication scheme (e.g., serial communication).

The setting storage unit 15 stores various types of setting information in the CSV file format. The setting information may include a counting period and time periods described later. The setting information stored in the setting storage unit 15 may be modified appropriately.

The control unit 12 executes control commands in accordance with the control schedule stored in the schedule storage unit 14, and collects histories of control and manual-operation, with regard to each of the intended apparatuses 21, 22, and 23 (see FIG. 2), constituting the group of loads 2. Further, the control unit 12 also includes a function of changing the schedule information on the basis of a history of manual-operation of the user, which is described in detail later.

The history storage unit 13 stores the history of control and the history of manual-operation with regard to each of the intended apparatuses 21, 22, and 23 collected by the control unit 12, as control information and manual-operation information, individually.

In this regard, the manual-operation information means history information (log), of the post-changed operation-states after change of the intended apparatuses 21, 22, and 23 caused by manual-operation by the user on the wall switches 41, and 43 and the remote control transmitter 42, and the manual-operation information further includes collecting times. In other words, the manual-operation information is defined as information indicative of a content (including an intended apparatus to be controlled), of a manual-operation conducted by a user and a time at which the manual-operation is conducted with regard to control on the intended apparatus 21, 22, 23. In the present embodiment, the operation-state of each of the intended apparatuses 21, 22, and 23 includes only the on-state and the off-state. The content of the manual-operation may include: an on-manual-operation of changing the operation-state of the intended apparatus 21, 22, 23 from the off-state to the on-state; and an off-manual-operation of changing the operation-state of the intended apparatus 21, 22, 23 from the on-state to the off-state.

Further, in this regard, the control information means history information of the post-changed operation-states after change of the intended apparatuses 21, 22, and 23 caused by control by the apparatus control device 1 on the intended apparatuses 21, 22, and 23, and the control information further includes collecting times. In other words, the control information is defined as information indicative of a content (including an intended apparatus to be controlled), of actual control conducted by the apparatus control device 1 and a time at which the actual control is conducted.

The history storage unit 13 manages the manual-operation information and the control information of them in a form of a history table 131 as shown in FIG. 3, for example. In this history table 131, a field of "RECEIVING TIME" indicates an obtaining time at which the manual-operation information or the control information is obtained, and a field of "TYPE" indicates whether the type is the manual-operation information or the control information, and a filed "TERMINAL" indicates the intended apparatus, and a field of "MANUAL OPERATION AND CONTROL RESULTS" indicates the post-changed operation-state. In the example shown FIG. 3, the history storage unit 13 stores the manual-operation information and the control information in time series in the order of obtaining them by the control unit 12.

The schedule storage unit 14 stores the control schedule including multiple control commands each defining a pair of the control time representing a control timing by the control unit 12 and the control content which are associated with each other. In this regard, the control content includes the intended apparatus to be controlled, and indicates how the apparatus control device 1 controls the operation-state of this intended apparatus. In the present embodiment, the operation-state of each of the intended apparatuses 21, 22, and 23 includes only the on-state and the off-state. Therefore, the control content may include: on-control of changing the operation-state of the intended apparatus 21, 22, 23 from the off-state to the on-state; and off-control of changing the operation-state of the intended apparatus 21, 22, 23 from the on-state to the off-state.

The schedule storage unit 14 manages the control schedule in a form of a control table 141 which describes time (control time), of executing on-control and off-control for each intended apparatus, as shown in FIG. 4, for example. In this control table 141, a field of "TERMINAL" indicates an intended apparatus such as the intended apparatuses 21, 22, and 23. With regard to fields of "SCHEDULE 1" to "SCHEDULE n", a field of "ON-CONTROL" indicates the control time of on-control and a field of "OFF-CONTROL" indicates the control time of off-control. In the example shown in FIG. 4, the schedule storage unit 14 stores the control time in association with the on-control or the off-control for each intended apparatus. In other words, in the control table 141 of FIG. 4, each of the fields of "ON-CONTROL" and the "OFF-CONTROL" of each of the fields "SCHEDULE 1" to "SCHEDULE n" of each intended apparatus describes an individual control command indicative of the control time and the control content associated with each other.

Further, the control table 141 of FIG. 4 includes a field of "ENERGY CONSUMPTION" and a field of "PREDICTED ENERGY" for each intended apparatus. The field of "ENERGY CONSUMPTION" indicates an energy consumption of an intended apparatus which works (is on), and the field of "PREDICTED ENERGY" indicates a predicted value of energy consumed by an intended apparatus for a day. The predicted energy may be a product of accumulated working (on) time of the intended apparatus in a day calculated from the control schedule and an energy consumption.

Further, the schedule storage unit 14 may store the aforementioned control schedule (the control table 141), for each of a business day, a holiday, and a specific day, for example. In this case, the control unit 12 may identify an attribute (e.g., a business day, a holiday, or a specific day), of a current day on the basis of a calendar function (not shown), and select the control schedule associated with the same attribute as the current day from multiple control schedules stored in the schedule storage unit 14, and use the selected control schedule. In this case, the predicted energy may be associated with values depending on the attributes such as a business day, a holiday, and a specific day.

The schedule storage unit 14 stores a default schedule which is a control schedule preliminarily set by an engineer.

According to the apparatus control device 1 of the present embodiment, the control unit 12 includes the following configuration in order to change the control schedule stored in the schedule storage unit 14 during operation.

In more detail, as shown in FIG. 1, the control unit 12 includes the execution unit 121, the obtainment unit 122, the identification unit 123, the determination unit 124, and the schedule change unit 126, as described above. Further, in the present embodiment, the control unit 12 includes a time period determination unit 125 and a cost conversion unit 127.

The execution unit 121 sends control signals to the group of loads (the intended apparatuses 21, 22, and 23) 2, on the basis of the control schedule stored in the schedule storage unit 14, and thereby controls the intended apparatuses 21, 22, and 23. In more detail, when a current time measured by a clock unit (not shown), reaches a control time on the control schedule, the execution unit 121 sends, on the basis of the control content associated with this control time, a corresponding control signal to a corresponding intended apparatus such as the intended apparatuses 21, 22, and 23, and thereby controls the corresponding intended apparatus such as the intended apparatuses 21, 22, and 23.

In an example of controlling the intended apparatus in accordance with the control table 141 shown in FIG. 4, the execution unit 121 executes on-control on the intended apparatuses of "LIGHTING 2" and "SIGNAGE 1" at "9:30", and executes on-control on the intended apparatuses of "LIGHTING 1" and "AIR CONDITIONER 1" at "10: 00". Thereafter, the execution unit 121 executes off-control on the intended apparatus of "LIGHTING 2" at "12:00", and executes off-control on the intended apparatuses of "LIGHTING 1", "AIR CONDITIONER 1", and "SIGNAGE 1" at "19:00". Further, the execution unit 121 sends request signals for requesting the control information to the group of loads 2 after sending the control signals.

The obtainment unit 122 obtains information indicative of the content of the manual-operation performed by the user with regard control of the intended apparatus such as the intended apparatuses 21, 22, and 23 from the group of loads 2, and stores the obtained information in the history storage unit 13 as the manual-operation information including an obtaining time (manual-operation time). Further, the obtainment unit 122 obtains information indicative of the operation-state sent from the group of loads 2 as a response to the request signal from the execution unit 121, and stores the obtained information in the history storage unit 13 as the control information including an obtaining time (control time). Note that, the obtainment unit 122 may obtain the manual-operation information from the wall switches 41 and 43 and the remote control transmitter 42 instead of the group of loads 2.

The identification unit 123 identifies a type of control indicated by the manual-operation information obtained by the obtainment unit 122. In more detail, in a process in which the obtainment unit 122 stores the manual-operation information in the history storage unit 13, the identification unit 123 determines whether the manual-operation information indicates on-control (on-manual-operation), or off-control (off-manual-operation), and further determine which one of the intended apparatuses 21, 22, and 23 is to be operated in accordance with the manual-operation information, and thereby classifies the manual-operation information with regard to its types. Further, in a similar manner to the manual-operation information, the identification unit 123 also identifies a type of control indicated by the control information obtained by the obtainment unit 122.

In the present embodiment, patterns of control are only two patterns describing on-control and off-control. However, for example, with regard to the intended apparatus 21 serving as a lighting fixture, the patterns of control may include patterns describing increase and decrease in a dimming level, and with regard to the intended apparatus 22 serving as an air conditioner, the patterns of control may include patterns describing increase and decrease in a desired temperature. In this case, the identification unit 123 identifies types of pieces of the manual-operation information for the same intended apparatus 21, 22, or 23 as being different when the patterns of control (e.g., on-control, off-control, increase in a dimming level, decrease in a dimming level, increase in a desired temperature, and decrease in a desired temperature) thereof are different.

The determination unit 124 accesses the history storage unit 13, and counts the number of times of obtaining the manual-operation information within a counting period equal to two days or more, for each type identified by the identification unit 123 and for each of multiple time periods, and determines whether the number of times of obtaining the same type of the manual-operation information within the same time period is equal to a predetermined threshold or more. In other words, the determination unit 124 counts the number of times of obtaining the same type of the manual-operation information for each time period on the basis of pieces of the manual-operation information within the counting period stored in the history storage unit 13, and thereby compares the number of times of obtaining with the threshold.

In this regard, the multiple time periods are defined as periods into which a day is divided. In the present embodiment, as one example, time periods of 0:00-1:00, 1:00-2:00 . . . , 23:00-24:00 obtained by dividing a day into twenty-four periods in a unit of one hour are used in determination performed by the determination unit 124. The counting period is a period for collecting the manual-operation information. In the present embodiment, as an example, the determination unit 124 uses a week (seven days), before a current day as the counting period. Note that, the counting period and the multiple time periods used by the determination unit 124 in determination are preliminarily stored in the setting storage unit 15 as the setting information. The above is merely one example, and the counting period and the multiple time periods may be appropriately set. In short, the determination unit 124 has a function of setting lengths of the multiple time periods used in determination.

According to the above configuration, with regard to the manual-operation information for the last week (the counting period), stored in the history storage unit 13, the determination unit 124 counts each of the number of times of the manual-operation information whose type is identified as on-control and the number of times of the manual-operation information whose type is identified as off-control, for each of the multiple time periods for each of the intended apparatuses. Hereinafter, the number of times of obtaining the manual-operation information whose type is identified as on-control is referred to as "the number of times of on-manual-operation", and the number of times of obtaining the manual-operation information whose type is identified as off-control is referred to as "the number of times of off-manual-operation".

The determination unit 124 compares the number of times of on-manual-operation with a first threshold, and compares the number of times of off-manual-operation with a second threshold. In this regard, the first threshold and the second threshold may be the same value but may be different values. The first threshold and the second threshold may be different depending on the intended apparatus. With regard to each of the intended apparatuses connected to the apparatus control device 1, the determination unit 124 determines whether the number of times of on-manual-operation is not less than the first threshold, and whether the number of times of off-manual-operation is not less than the second threshold, for each of the multiple time periods, and outputs results of determination to the schedule change unit 126.

For example, it is assumed that manual-operation of turning on the intended apparatus 21 was performed within the time period of 10:00-11:00 every day during the last week. In this case, the determination unit 124 determines that the number of times of on-manual-operation within the same time period (10:00-11:00), during the counting period with regard to this intended apparatus 21 is seven. When the first threshold is assumed to be "4", the determination unit 124 determines that the number of times (7), of on-manual-operation on the intended apparatus 21 within the time period of "10:00-11:00" is equal to the first threshold (4), or more.

When the number of times of obtaining the same type of manual-operation information within the same time period is determined to be equal to the predetermined threshold or more by the determination unit 124, the schedule change unit 126 changes the control schedule in the schedule storage unit 14 on the basis of this manual-operation information. In this regard, the schedule change unit 126 performs change of the control schedule by shifting (modifying), the control time of the control command already set in the control schedule in the schedule storage unit 14 or by adding a new control command to the control schedule. A method of changing the control schedule by the schedule change unit 126 is described in detail later.

The cost conversion unit 127 calculates a cost (charge), from a consumption of resources of an intended apparatus such as the intended apparatuses 21, 22, and 23. In the present embodiment, the resources are electricity, and therefore the cost conversion unit 127 converts a predicted (consumed), energy in a case of controlling the intended apparatus in accordance with the control schedule into a cost by use of an electrical rate preliminarily stored in the setting storage unit 15 as the setting information. The display output unit 11 displays at least one of the cost obtained by conversion by the cost conversion unit 127 in the aforementioned manner and the predicted (consumed) energy before conversion, on the display terminal 5.

When the number of times of obtaining the same type of manual-operation information within the same time period is determined to be equal to the predetermined threshold or more by the determination unit 124, the time period determination unit 125 determines whether this time period is included in a monitoring period. In this regard, the monitoring period is decided on the basis of the control time associated with the control content of the same type as this manual-operation information to be constituted by at least one of predetermined time periods prior to and subsequent to this control time. In other words, the time period determination unit 125 determines whether the predetermined monitoring period based on the control time already set in the control schedule includes the time period relating to the number of times of obtaining the manual-operation information of the same type as the control content associated with this the control time which is determined to be equal to the predetermined threshold or more.

For example, in a case where the on-control on the intended apparatus 21 is associated with the control time of "12:00" in the control schedule, when the monitoring period is assumed to be constituted by one hour before and one hour after the control time, the monitoring period relating to the on-control on the intended apparatus 21 is "11:00-13:00". In this case, when the number of times of the on-manual-operation of the intended apparatus 21 within a specific time period is determined to be equal to the first threshold or more by the determination unit 124, the time period determination unit 125 determines whether this specific time period is included in the monitoring period. For example, when the time period relating to the number of times of the on-manual-operation of the intended apparatus 21 determined to be equal to the first threshold or more by the determination unit 124 is "11:00-12:00" or "1200-1300", the time period determination unit 125 determines that this time period is included in the monitoring period.

In more detail, as described later, the time period determination unit 125 determines whether the time period of interest is included in a determination period set on the basis of the control time of the control schedule and further determines whether the determination period is equal to the monitoring period. Accordingly, when the number of times of obtaining the same type of manual-operation information within the same time period is determined to be equal to the predetermined threshold or more by the determination unit 124, the time period determination unit 125 determines whether this time period is included in the monitoring period.

When the time period is determined to be included in the monitoring period by the time period determination unit 125, the schedule change unit 126 changes the control time as the basis of this monitoring period, in accordance with the manual-operation information of interest.

In contrast, when the time period is determined to be not included in the monitoring period by the time period determination unit 125, the schedule change unit 126 adds a new control command to the control schedule on the basis of the manual-operation information of interest.

Note that, a relation between the monitoring period and the control time as the basis for the monitoring period is preliminarily stored in the setting storage unit 15 as the setting information. The above (the monitoring period is constituted by one hour before and one hour after the control time as the basis), is merely one example, and the relation may be appropriately set.

Next, an operation of changing the control schedule in the apparatus control device 1 with the above configuration is described with reference to a flow chart shown in FIG. 5. The following description focuses on a specific intended apparatus 21, and a process in a case of changing the control schedule of this intended apparatus 21 is described. Actually, the apparatus control device 1 repeats the similar process to the above process for the multiple intended apparatuses, and thereby changes the control schedules of the multiple intended apparatuses. Further, in the following, each of the first threshold and the second threshold is assumed to be "3".

The apparatus control device 1 performs a process of counting the number of pieces of the manual-operation information for the predetermined counting period (in the present embodiment, the last week), for each type for each time period (S1 in FIG. 5). In more detail, regarding the intended apparatus 21, the apparatus control device 1 counts the number of pieces of the manual-operation information for each pattern of control (e.g., the on-control and the off-control), and each time period within which the manual-operation information is obtained. In the present embodiment, the apparatus control device 1 performs a series of the following processes S2 to S19 for each time period, and repeats the series for all of the time periods, and thereby completes the change of the control schedule. Hereinafter, the time period of interest is referred to as "intended time period".

The apparatus control device 1 refers to the result of the process S1, and determines whether the number of times of off-manual-operation of the intended apparatus 21 within the intended time period is equal to the second threshold or more (S2). When the number of times of off-manual-operation within the intended time period is equal to the second threshold or more (S2: Yes), the apparatus control device 1 determines whether the intended time period is included in the determination period based on the control time associated with the control content set in the control schedule regarding the intended apparatus 21 (S3).

In this regard, the determination period is a period set based on the control time on the control schedule. When the control time as the basis is associated with the control content (the off-control, in this example) of the same type as the manual-operation information (after-mentioned process S4: Yes) whose number of times of obtaining is determined to be equal to the threshold or more, the determination period is equal to the monitoring period. The determination period is assumed to be a period constituted by one hour before and one hour after the control time as the basis.

When the intended time period is included within the determination period (S3: Yes), the apparatus control device 1 identifies the type of the control content associated with the control time as the basis of this determination period (S4). When the control content associated with the control time indicates the off-control (S4: Yes), that is, the intended time period is included in the monitoring period, the apparatus control device 1 executes a change process P1 of changing the control schedule (S5).

The "change process P1" is a process of reading out the obtaining time of a piece of the manual-operation information which is the earliest in the obtaining time (manual-operation time), of pieces of the manual-operation information (the off-manual-operation, in this example), obtained within the intended time period from the history storage unit 13, and reserving change of the control time as the basis of the determination period on the basis of read-out obtaining time. According to such a change process P1, in the control schedule stored in the schedule storage unit 14, the control time of the off-control on the intended apparatus 21 is changed to the obtaining time read out from the history storage unit 13.

In this regard, the manual-operation information which is the earliest in the obtaining time of pieces of the manual-operation information (the off-manual-operation), obtained within the intended time period is defined as manual-operation information corresponding to the shortest working time of the intended apparatus 21, which means manual-operation information obtained at a time which is the smallest in a consumption of the resources (electricity), in the intended apparatus 21. In short, when the number of times of obtaining the same type of the manual-operation information within the same time period is determined to be equal to the predetermined threshold or more, the schedule change unit 126 changes the control schedule on the basis of the manual-operation information obtained at a time which is the smallest in a consumption of the resources of times at which pieces of the same type of the manual-operation information are obtained.

Figure 6:
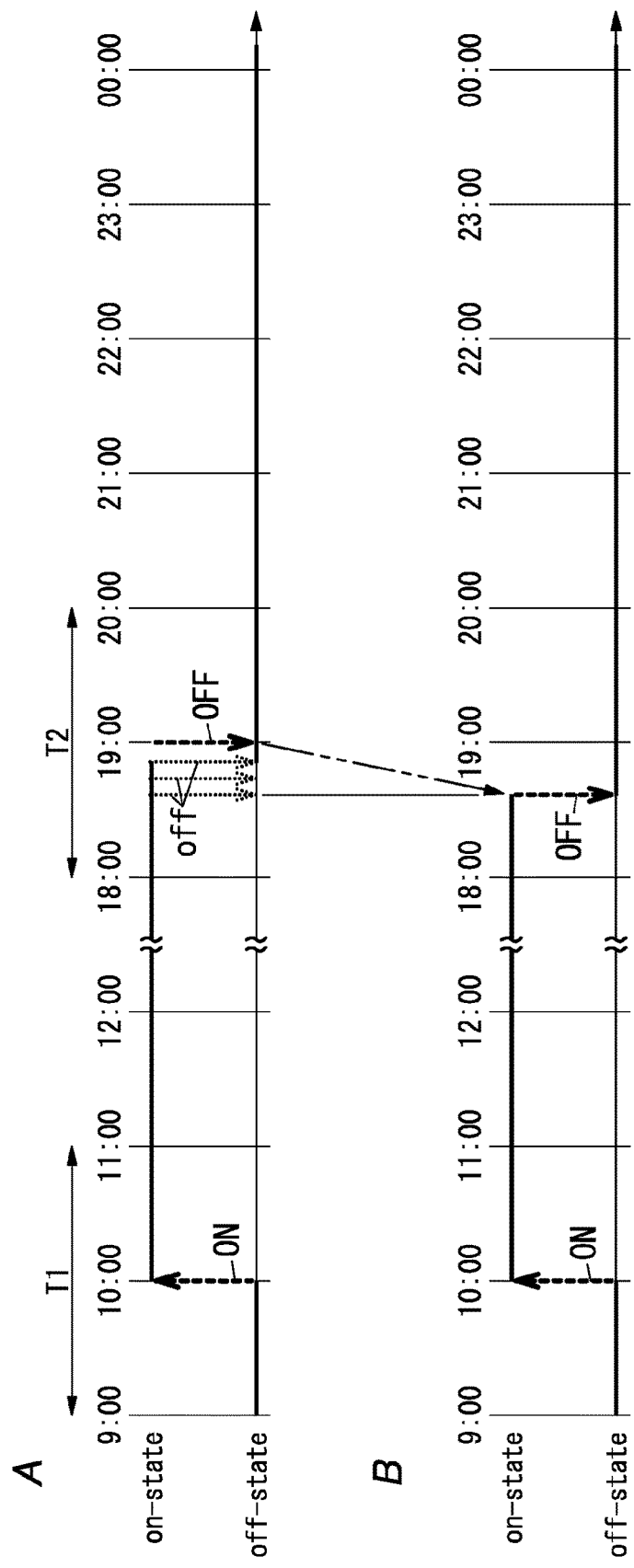
FIG. 6 is an explanatory view illustrating an operation example of the apparatus control device in accordance with the embodiment 1.
Figure 7:
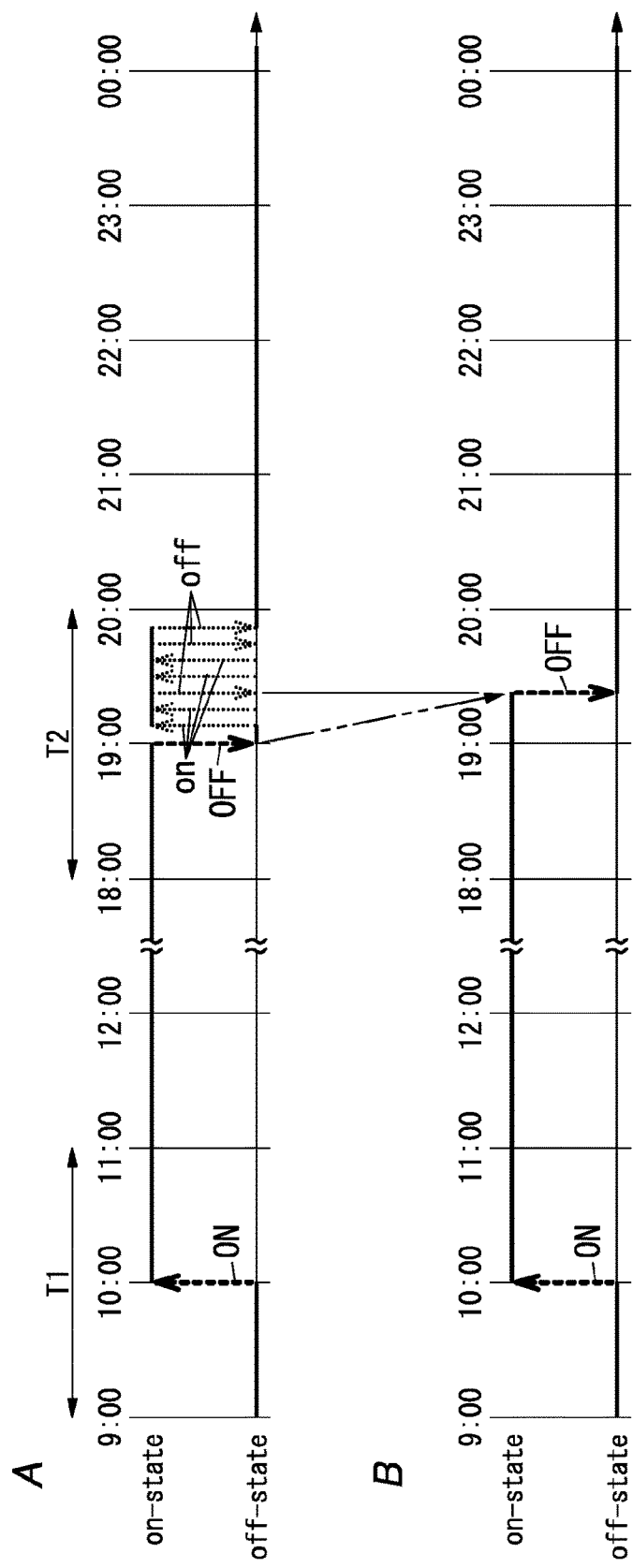
FIG. 7 is an explanatory view illustrating an operation example of the apparatus control device in accordance with the embodiment 1.
Figure 8:
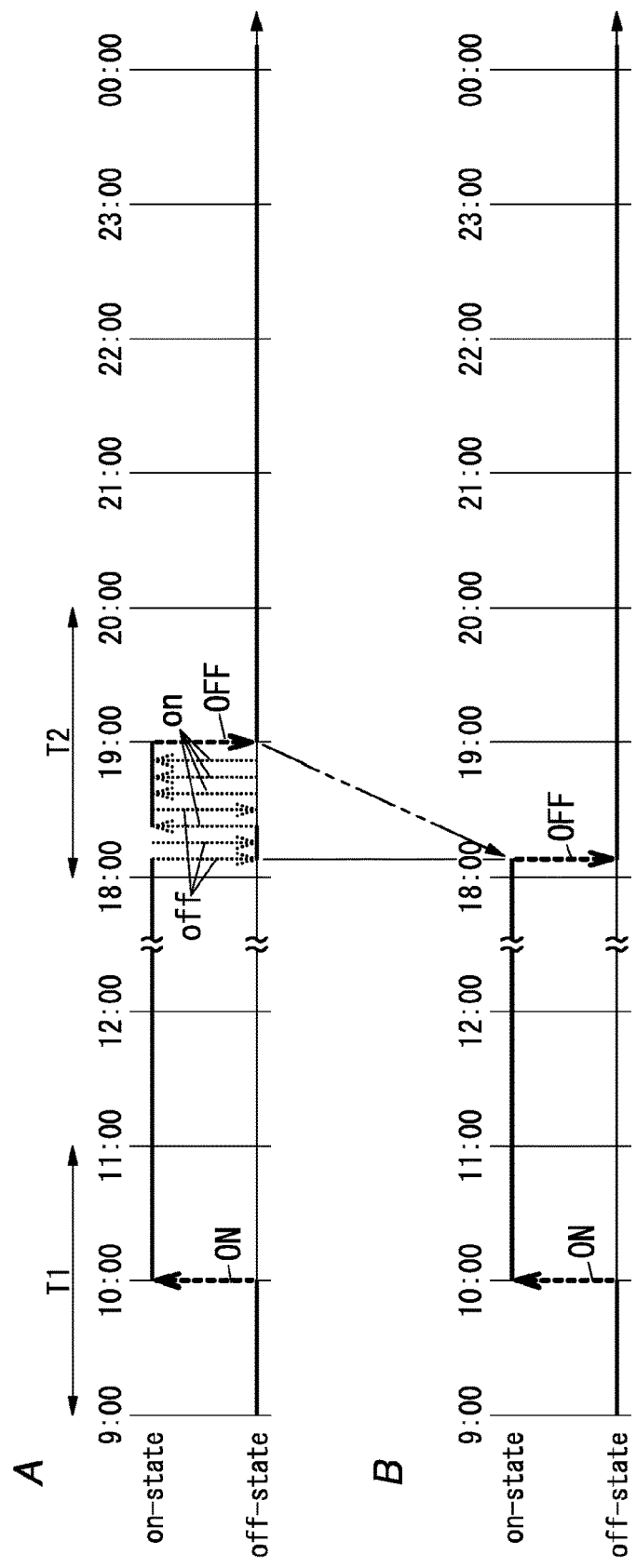
FIG. 8 is an explanatory view illustrating an operation example of the apparatus control device in accordance with the embodiment 1.

Next, concrete examples of the operation of the apparatus control device 1 with regard to the change process P1 are described briefly with reference to FIGS. 6 to 8. Note that, in FIGS. 6 to 8, with regard to the intended apparatus 21, "A" designates an example of the pre-changed control schedule, and "B" designates an example of the post-changed control schedule, and "ON" means the on-control on the control schedule, and "OFF" means the off-control on the control schedule, and "on" means the on-manual-operation, and "off" means the off-manual-operation. Further, in FIGS. 6 to 8, a vertical axis indicates which one of the on-state and the off-state the state of the intended apparatus 21 is. Such a representation manner is applied to FIGS. 9 to 17 described later.

In this regard, the control schedule is assumed to be set so that the on-control is performed on the intended apparatus 21 at 10:00 and the off-control is performed on the intended apparatus 21 at 19:00.

In the example designated by "A" in FIG. 6, the off-manual-operation for the intended apparatus 21 is performed at 18:35 on November 1, at 18:40 on November 2, and at 18:50 on November 4 which are included in the counting period. In this example, the number of times of off-manual-operation in the time period of 18:00-19:00 within the counting period is equal to the threshold or more (S2: Yes), and this time period is included in the determination period (18:00-20:00) T2 (S3: Yes). Further, the control content associated with the control time as the basis for this determination period is the off-control (S4: Yes).

Therefore, the control schedule is changed by the change process P1 so that the control time of the control command of the off-control which is originally set to 19:00 is shifted to 18:35 which is the earliest obtaining time of the manual-operation information within the time period of 18:00-19:00, as shown in FIG. 6 as "B".

Further, in the example designated by "A" in FIG. 7, with regard to the time period of 19:00-20:00 within the counting period, the number of times of off-manual-operation of the intended apparatus 21 is three, and the number of times of on-manual-operation of the intended apparatus 21 is four. In this case, the number of times of off-manual-operation in the time period of 19:00-20:00 is equal to the threshold or more (S2: Yes), and the basis of the determination period T2 including this time period is the off-control (S3: Yes, S4: Yes).

Therefore, the control schedule is changed by the change process P1 so that the control time of the control command of the off-control which is originally set to 19:00 is shifted to 19:25 which is the earliest obtaining time of the manual-operation information (the off-manual-operation) within the time period of 19:00-20:00, as shown in FIG. 7 as "B".

Further, in the example designated by "A" in FIG. 8, with regard to the time period of 18:00-19:00 within the counting period, the number of times of off-manual-operation of the intended apparatus 21 is three, and the number of times of on-manual-operation of the intended apparatus 21 is four. In this case, the number of times of off-manual-operation in the time period of 18:00-19:00 is equal to the threshold or more (S2: Yes), and the basis of the determination period T2 including this time period is the off-control (S3: Yes, S4: Yes).

Therefore, the control schedule is changed by the change process P1 so that the control time of the control command of the off-control which is originally set to 19:00 is shifted to 18:10 which is the earliest obtaining time of the manual-operation information (the off-manual-operation) within the time period of 18:00-19:00, as shown in FIG. 8 as "B".

When in the process S4 the control content associated with the control time is not the off-control (S4: No), that is, the control content is the on-control, the apparatus control device 1 refers to the result of the process S1, and determines whether the number of times of on-manual-operation of the intended apparatus 21 within the intended time period is equal to the first threshold or more (S6). In other words, when the control time as the basis for the determination period is not corresponding to the control content (in this example, the off-control) of the same type as the manual-operation information whose obtaining time within the intended time period is determined to be equal to the threshold or more (S4: No), the determination period is not identical to the monitoring period. Therefore, in this case, the apparatus control device 1 determines by the time period determination unit 125 that the intended time period is not included in the monitoring period, and starts to perform the process S6.

When the number of times of on-manual-operation is equal to the first threshold or more (S6: Yes), the apparatus control device 1 performs a change process P2 of changing the control schedule (S7).

The "change process P2" is a process of reading out the obtaining time of a piece of the manual-operation information which is the latest in the obtaining time (manual-operation time), of pieces of the manual-operation information (the on-manual-operation, in this example), obtained within the intended time period from the history storage unit 13, and reserving change of the control time as the basis of the determination period on the basis of read-out obtaining time. According to such a change process P2, in the control schedule stored in the schedule storage unit 14, the control time of the on-control on the intended apparatus 21 is changed to the obtaining time read out from the history storage unit 13.

In this regard, the manual-operation information which is the latest in the obtaining time of pieces of the manual-operation information (the on-manual-operation), obtained within the intended time period is defined as manual-operation information corresponding to the shortest working time of the intended apparatus 21, which means manual-operation information obtained at a time which is the smallest in a consumption of the resources (electricity), in the intended apparatus 21. In short, when the number of times of obtaining the same type of the manual-operation information within the same time period is determined to be equal to the predetermined threshold or more, the schedule change unit 126 changes the control schedule on the basis of the manual-operation information obtained at a time which is the smallest in a consumption of the resources of times at which pieces of the same type of the manual-operation information are obtained.

According to the above operation, when, with regard to two or more types of the manual-operation information, the number of times of obtaining the same type of manual-operation information within the same time period is determined to be equal to the threshold or more by the determination unit 124, the schedule change unit 126 can use preferentially the manual-operation information of the same type as the control content associated with the control time used as the basis of the monitoring period. In more detail, the process S4 is performed prior to the process S6, and therefore, when the number of times of obtaining is equal to the threshold or more with regard to two or more types of the manual-operation information, the schedule change unit 126 uses preferentially the manual-operation information of the same type as the control content associated with the control time used as the basis of the monitoring period, for change of the control schedule. In other words, when two or more types of the manual-operation information (in this example, the on-manual-operation and the off-manual-operation) each fulfils a condition where the number of times of obtaining is equal to the threshold or more, the manual-operation information (in this example, the off-manual-operation) of the same type as the control content as the basis for the monitoring period is used preferentially in the change of the control schedule.

Figure 9:
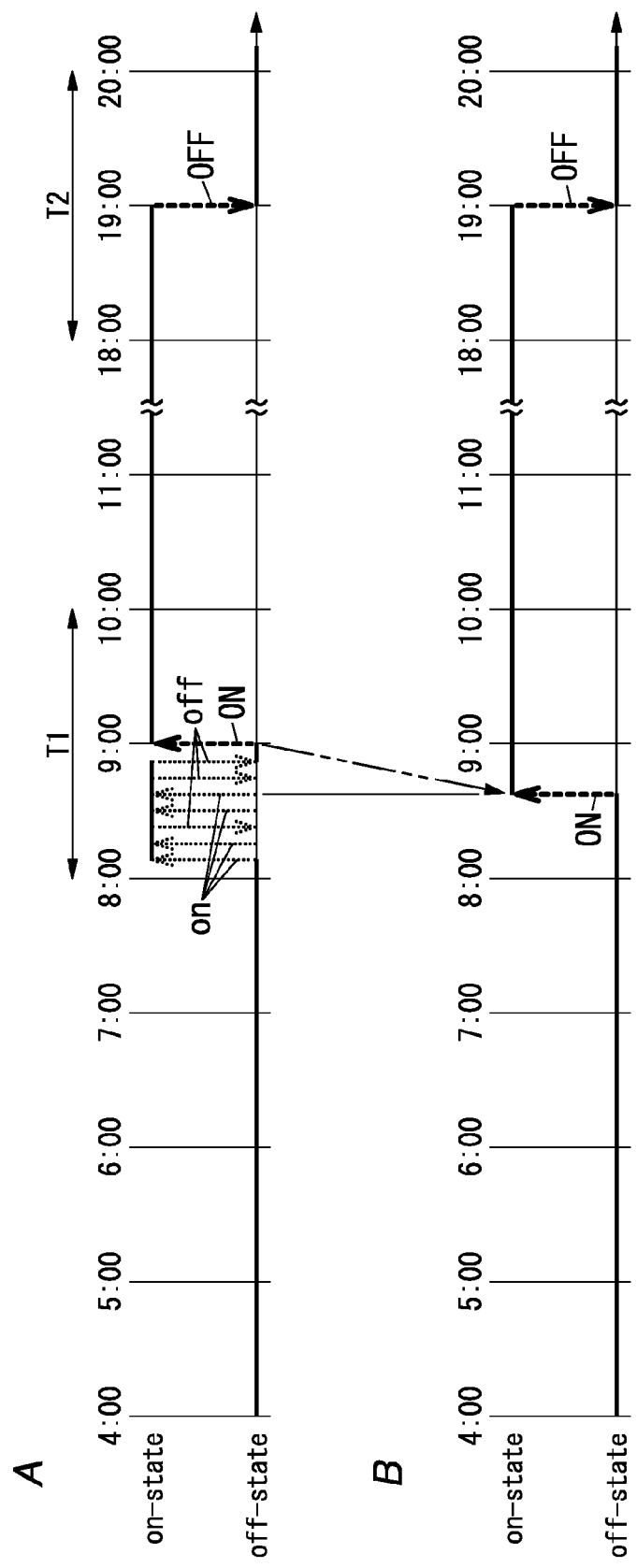
FIG. 9 is an explanatory view illustrating an operation example of the apparatus control device in accordance with the embodiment 1.
Figure 10:
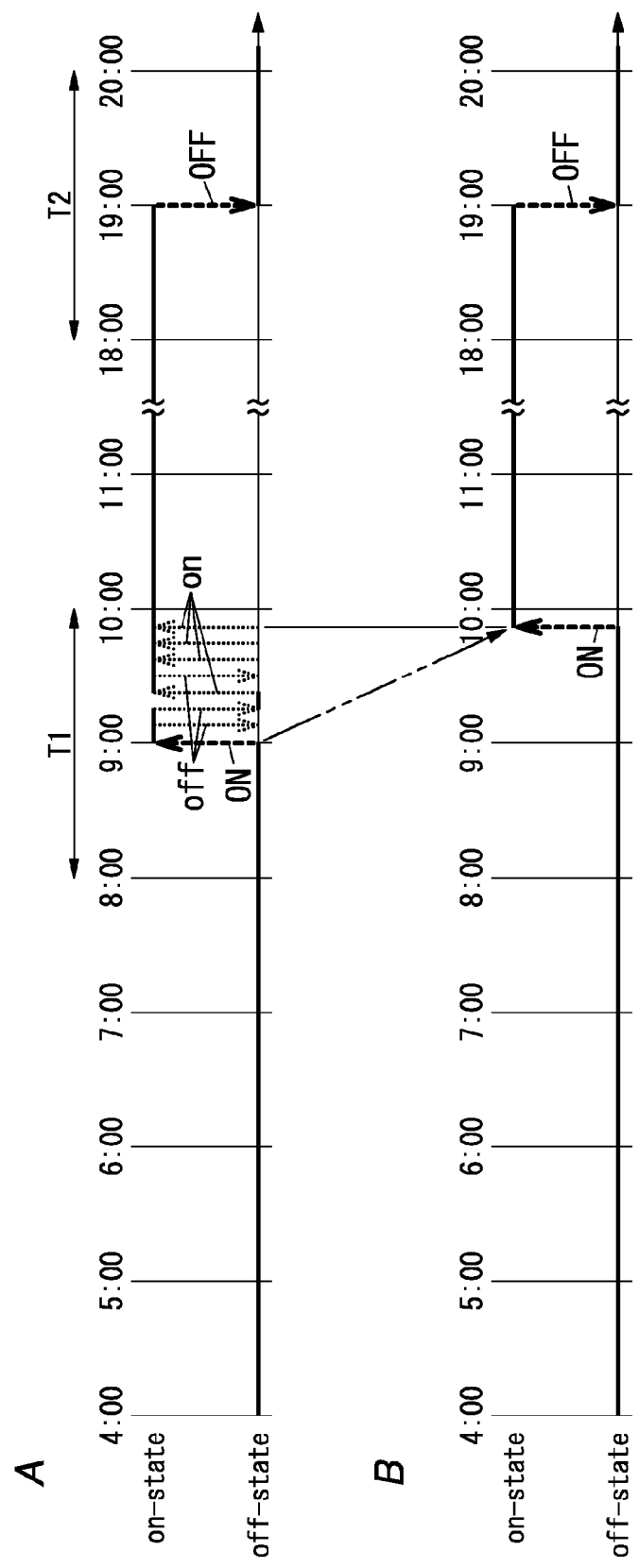
FIG. 10 is an explanatory view illustrating an operation example of the apparatus control device in accordance with the embodiment 1.

Next, concrete examples of the operation of the apparatus control device 1 with regard to the change process P2 are described briefly with reference to FIGS. 9 and 10.

In this regard, the control schedule is assumed to be set so that the on-control is performed on the intended apparatus 21 at 9:00 and the off-control is performed on the intended apparatus 21 at 19:00.

Further, in the example designated by "A" in FIG. 9, with regard to the time period of 8:00-9:00 within the counting period, the number of times of off-manual-operation of the intended apparatus 21 is three, and the number of times of on-manual-operation of the intended apparatus 21 is four. In this case, the number of times of off-manual-operation in the time period of 8:00-9:00 is equal to the threshold or more (S2: Yes), and the basis of the determination period (8:00-10:00) T1 including this time period is the on-control (S3:

Yes, S4: No). Further, the number of times of on-manual-operation in this time period is equal to the threshold or more (S6: Yes).

Therefore, the control schedule is changed by the change process P2 so that the control time of the control command of the on-control which is originally set to 9:00 is shifted to 8:35 which is the latest obtaining time of the manual-operation information (the on-manual-operation) within the time period of 8:00-9:00, as shown in FIG. 9 as "B".

Further, in the example designated by "A" in FIG. 10, with regard to the time period of 9:00-10:00 within the counting period, the number of times of off-manual-operation of the intended apparatus 21 is three, and the number of times of on-manual-operation of the intended apparatus 21 is four. In this case, the number of times of off-manual-operation in the time period of 9:00-10:00 is equal to the threshold or more (S2: Yes), and the basis of the determination period T1 including this time period is the on-control (S3: Yes, S4: No). Further, the number of times of on-manual-operation in this time period is equal to the threshold or more (S6: Yes).

Therefore, the control schedule is changed by the change process P2 so that the control time of the control command of the on-control which is originally set to 9:00 is shifted to 9:45 which is the latest obtaining time of the manual-operation information (the on-manual-operation) within the time period of 9:00-10:00, as shown in FIG. 10 as "B".

When the intended time period is determined to not be included in the determination period in the process S3 (S3: No), or when the number of times of on-manual-operation is determined to be less than the first threshold in the process S6 (S6: No), the apparatus control device 1 performs a change process P3 of changing the control schedule (S8). The "change process P3" is a process of reading out the obtaining time of a piece of the manual-operation information which is the earliest in the obtaining time (manual-operation time), of pieces of the manual-operation information (the off-manual-operation), obtained within the intended time period from the history storage unit 13 and reserving addition of a new control command to the control schedule on the basis of the manual-operation information.

In a concrete example, the apparatus control device 1 reserves addition of a new control command including the control time defined by the obtaining time of the manual-operation information read out from the history storage unit 13 and the control content defined by the off-control of the intended apparatus 21, to the control schedule. According to such a change process P3, a new control command in which the off-control of the intended apparatus 21 is associated with the obtaining time read out from the history storage unit 13 is added to the control schedule stored in the schedule storage unit 14.

Figure 11:
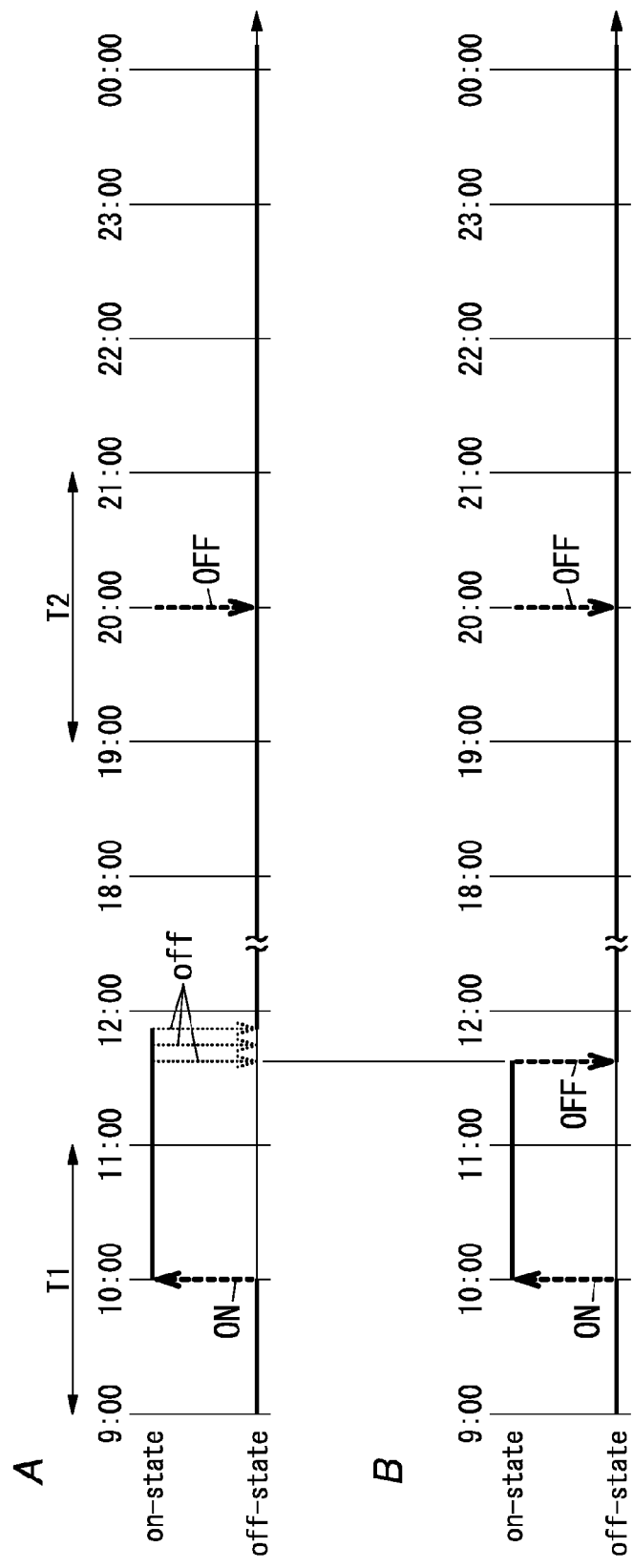
FIG. 11 is an explanatory view illustrating an operation example of the apparatus control device in accordance with the embodiment 1.
Figure 12:
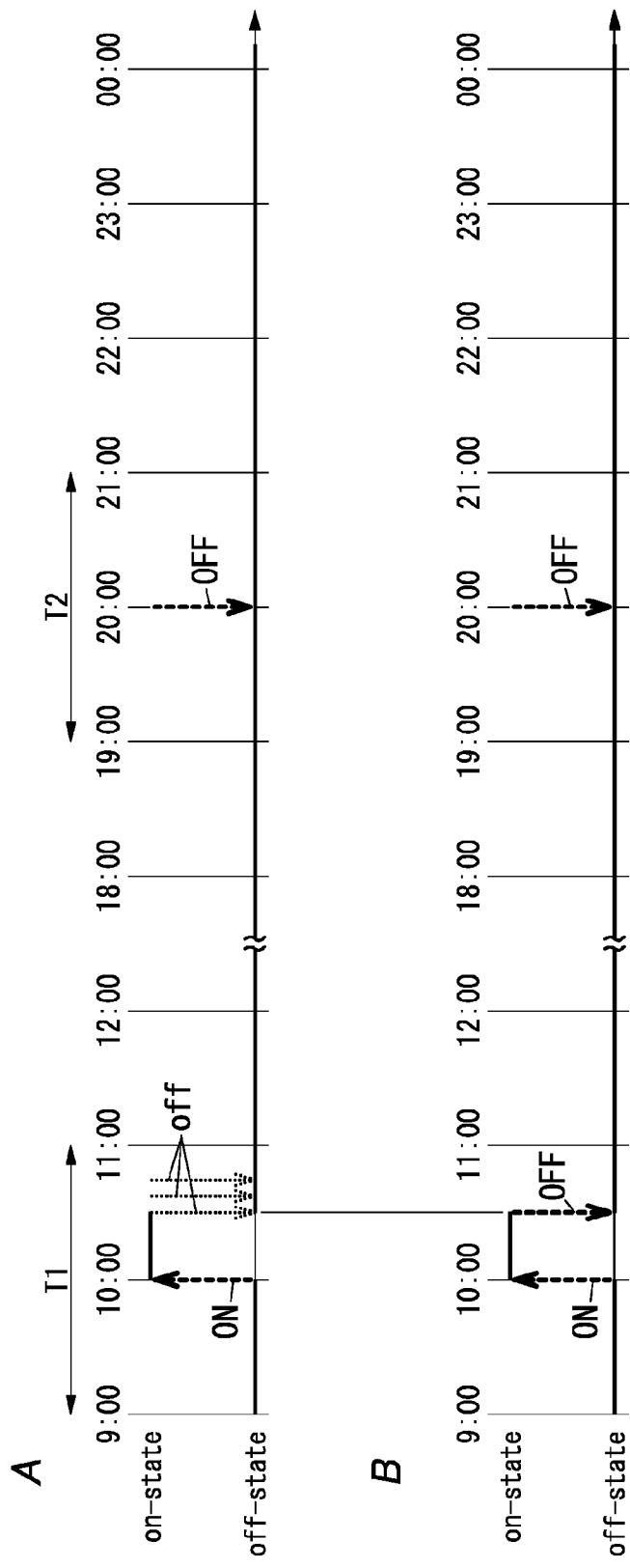
FIG. 12 is an explanatory view illustrating an operation example of the apparatus control device in accordance with the embodiment 1.
Figure 13:
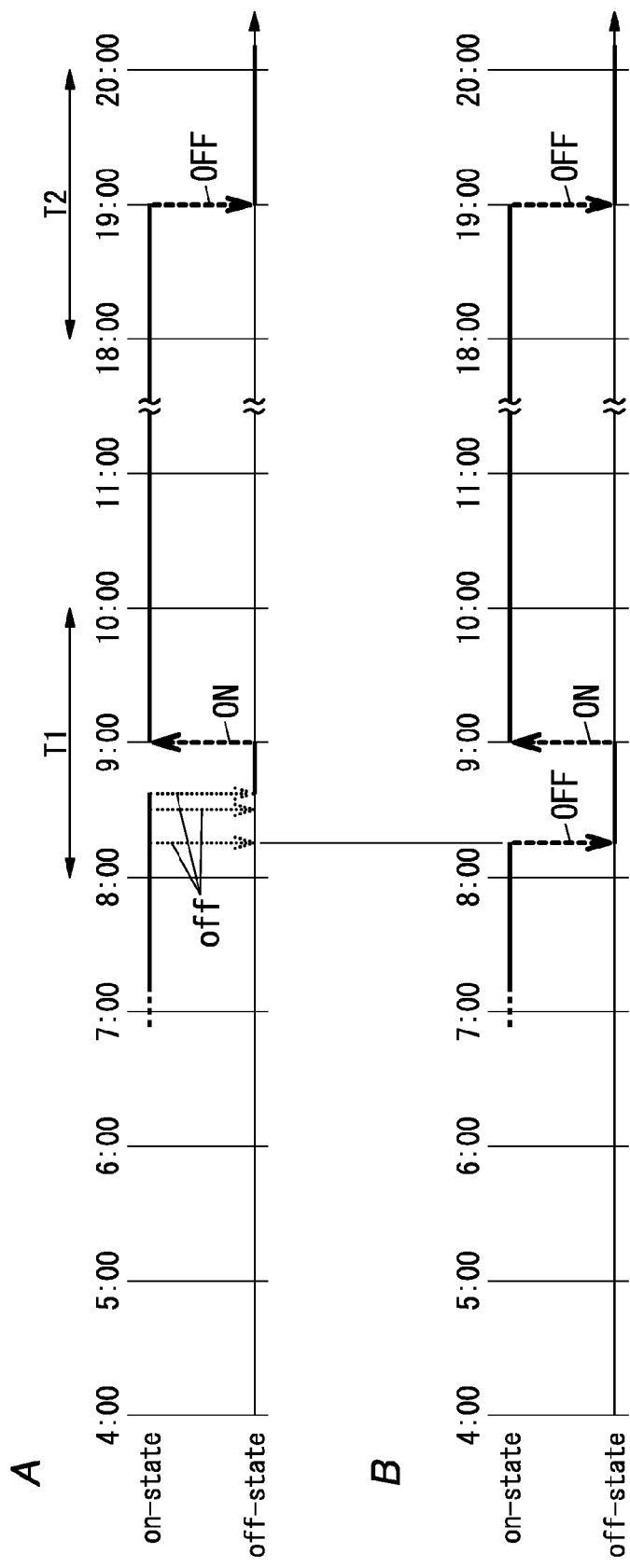
FIG. 13 is an explanatory view illustrating an operation example of the apparatus control device in accordance with the embodiment 1.

Next, concrete examples of the operation of the apparatus control device 1 with regard to the change process P3 are described briefly with reference to FIGS. 11 to 13.

In this regard, the control schedule is assumed to be set so that the on-control is performed on the intended apparatus 21 at 10:00 and the off-control is performed on the intended apparatus 21 at 20:00. Further, in the example shown in FIG. 13, the control schedule is assumed to be set so that the on-control is performed on the intended apparatus 21 at 9:00 and the off-control is performed on the intended apparatus 21 at 19:00.

In the example designated by "A" in FIG. 11, with regard to the time period of 11:00-12:00 within the counting period, the number of times of off-manual-operation is three. In this case, the number of times of off-manual-operation in the time period of 11:00-12:00 is equal to the threshold or more (S2: Yes). However, this time period is not included in any of the determination period (9:00-11:00) T1 on the basis of the on-control and the determination period (19:00-21:00) T2 on the basis of the off-control (S3: No).

Therefore, according to the change process P3, the control command defining the pair of the off-control and the control time indicative of 11:35 which is the earliest obtaining time of the manual-operation information (the off-manual-operation) within the time period of 11:00-12:00, is newly added to the control schedule, as shown in FIG. 11 as "B".

Further, in the example designated by "A" in FIG. 12, with regard to the time period of 10:00-11:00 within the counting period, the number of times of off-manual-operation is three. In this case, the number of times of off-manual-operation in the time period of 10:00-11:00 is equal to the threshold or more (S2: Yes), and the basis of the determination period (9:00-11:00) T1 including this time period is the on-control (S3: Yes, S4: No). Further, the number of times of on-manual-operation in this time period is less than the threshold (S6: No).

Therefore, according to the change process P3, the control command defining the pair of the off-control and the control time indicative of 10:30 which is the earliest obtaining time of the manual-operation information (the off-manual-operation) within the time period of 10:00-11:00, is newly added to the control schedule, as shown in FIG. 12 as "B".

Further, in the example designated by "A" in FIG. 13, with regard to the time period of 8:00-9:00 within the counting period, the number of times of off-manual-operation is three. In this case, the number of times of off-manual-operation in the time period of 8:00-9:00 is equal to the threshold or more (S2: Yes), and the basis of the determination period (8:00-10:00) T1 including this time period is the on-control (S3: Yes, S4: No). Further, the number of times of on-manual-operation in this time period is less than the threshold (S6: No).

Therefore, according to the change process P3, the control command defining the pair of the off-control and the control time indicative of 8:20 which is the earliest obtaining time of the manual-operation information (the off-manual-operation) within the time period of 8:00-9:00, is newly added to the control schedule, as shown in FIG. 13 as "B".

When the number of times of off-manual-operation in the intended time period is determined to be less than the second threshold in the process S2 (S2: No), the apparatus control device 1 determines whether the number of times of on-manual-operation of the intended apparatus 21 in the intended time period is equal to the first threshold or more (S9).

When the number of times of on-manual-operation in the intended time period is equal to the first threshold or more (S9: Yes), the apparatus control device 1 determines whether the intended time period is included in the determination period based on the control time associated with the control content set on the control schedule with regard to the intended apparatus 21 (S10). In this regard, the determination period is a period set based on the control time on the control schedule. When the control time as the basis is associated with the control content (the on-control, in this example) of the same type as the manual-operation information whose number of times of obtaining within the intended time period is determined to be equal to the threshold or more, (after-mentioned process S11: Yes), the determination period is equal to the monitoring period. Note that, when the number of times of on-manual-operation in the intended time period is determined to be less than the first threshold in the process S9 (S9: No), the apparatus control device 1 ends the schedule change process with regard to the intended time period.

When the intended time period is included in the determination period (S10: Yes), the apparatus control device 1 identifies the type of the control content associated with the control time as the basis for this determination period (S11). When the control content associated with the control time is the on-control (S11: Yes), that is, the intended time period is included in the monitoring period, the apparatus control device 1 performs the change process P2 (S12). Therefore, the apparatus control device 1 reads out the obtaining time of a piece of the manual-operation information which is the latest in the obtaining time (manual-operation time), of pieces of the manual-operation information (the on-manual-operation), obtained within the intended time period from the history storage unit 13, and reserves change of the control time as the basis of the determination period on the basis of read-out obtaining time.

Figure 14:
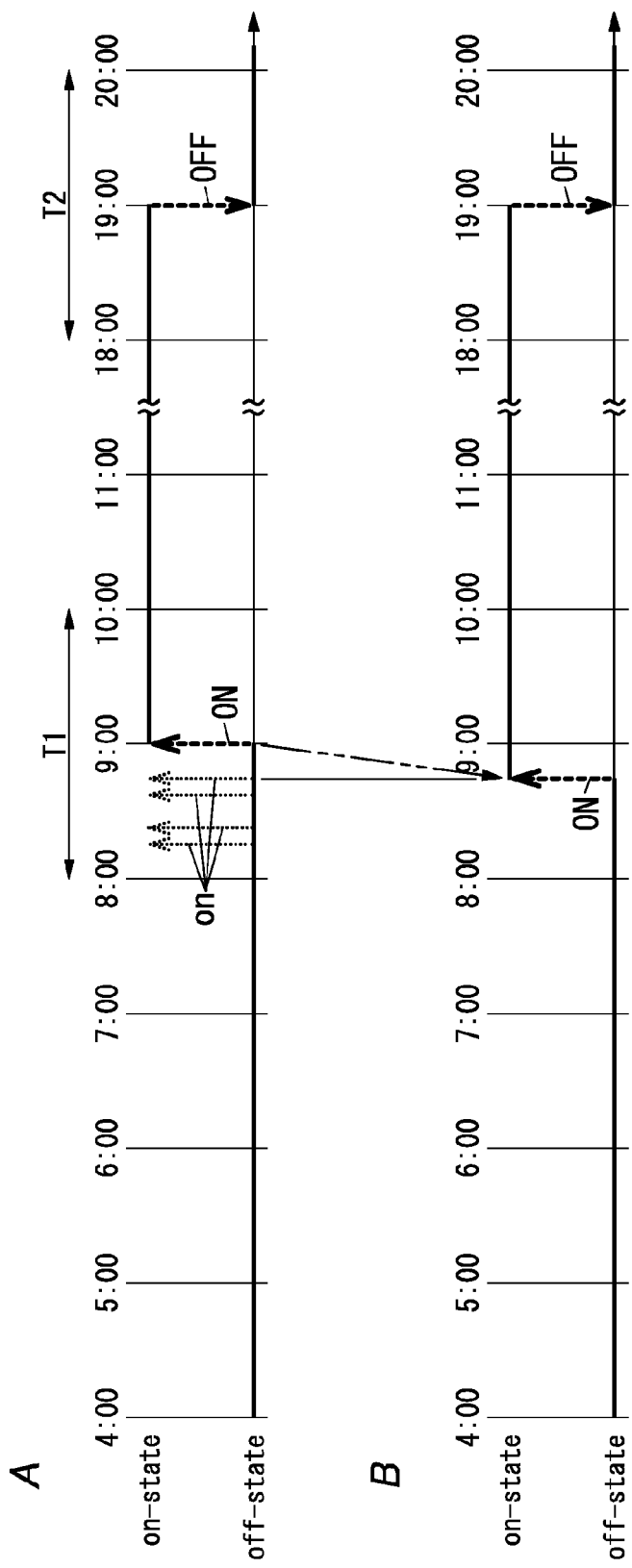
FIG. 14 is an explanatory view illustrating an operation example of the apparatus control device in accordance with the embodiment 1.

The following brief explanation referring to FIG. 14 is made to a concrete example of the operation of the apparatus control device 1 in a case where the change process P2 is performed after the number of times of off-manual-operation within the intended time period is determined to not be equal to the second threshold or more in the process S2.

In this regard, the control schedule is assumed to be set so that the on-control is performed on the intended apparatus 21 at 9:00 and the off-control is performed on the intended apparatus 21 at 19:00.

In the example designated by "A" in FIG. 14, with regard to the time period of 8:00-9:00 within the counting period, the number of times of on-manual-operation is four. In this case, the number of times of on-manual-operation in the time period of 8:00-9:00 is equal to the threshold or more (S9: Yes), and the basis of the determination period (8:00-10:00) T1 including this time period is the on-control (S10: Yes, S11: Yes).

Therefore, the control schedule is changed by the change process P2 so that the control time of the control command of the on-control which is originally set to 9:00 is shifted to 8:45 which is the latest obtaining time of the manual-operation information (the on-manual-operation) within the time period of 8:00-9:00, as shown in FIG. 14 as "B".

When the control content associated with the control time is not the on-control in the process S11 (S11: No), that is, the control content is the off-control, the apparatus control device 1 determines whether the number of times of off-manual-operation of the intended apparatus 21 in the intended time period is equal to the second threshold or more (S13). When the number of times of off-manual-operation is equal to the second threshold or more (S13: Yes), the apparatus control device 1 performs the change process P1. Therefore, the apparatus control device 1 reads out the obtaining time of a piece of the manual-operation information which is the earliest in the obtaining time (manual-operation time), of pieces of the manual-operation information (the off-manual-operation), obtained within the intended time period from the history storage unit 13, and reserves change of the control time as the basis of the determination period on the basis of read-out obtaining time (S14).

According to the above operation, when, with regard to two or more types of the manual-operation information, the number of times of obtaining the same type of manual-operation information within the same time period is determined to be equal to the threshold or more by the determination unit 124, the schedule change unit 126 can use preferentially the manual-operation information of the same type as the control content associated with the control time used as the basis of the monitoring period. In more detail, the process S11 is performed prior to the process S13, and therefore, when the number of times of obtaining is equal to the threshold or more with regard to two or more types of the manual-operation information, the schedule change unit 126 uses preferentially the manual-operation information of the same type as the control content associated with the control time used as the basis of the monitoring period, for change of the control schedule. In other words, when two or more types of the manual-operation information (in this example, the on-manual-operation and the off-manual-operation) each fulfils a condition where the number of times of obtaining is equal to the threshold or more, the manual-operation information (in this example, the on-manual-operation) of the same type as the control content as the basis for the monitoring period is used preferentially in the change of the control schedule.

When the intended time period is determined to not be included in the determination period in the process S10 (S10: No), or when the number of times of off-manual-operation is determined to be less than the second threshold in the process S13 (S13: No), the apparatus control device 1 performs a change process P4 of changing the control schedule (S15). The "change process P4" is a process of reading out the obtaining time of a piece of the manual-operation information which is the latest in the obtaining time (manual-operation time), of pieces of the manual-operation information (the on-manual-operation), obtained within the intended time period from the history storage unit 13 and reserving addition of a new control command to the control schedule on the basis of the manual-operation information.

In a concrete example, the apparatus control device 1 reserves addition of a new control command including the control time defined by the obtaining time of the manual-operation information read out from the history storage unit 13 and the control content defined by the on-control of the intended apparatus 21, to the control schedule. According to such a change process P4, a new control command in which the on-control of the intended apparatus 21 is associated with the obtaining time read out from the history storage unit 13 is added to the control schedule stored in the schedule storage unit 14.

Figure 15:
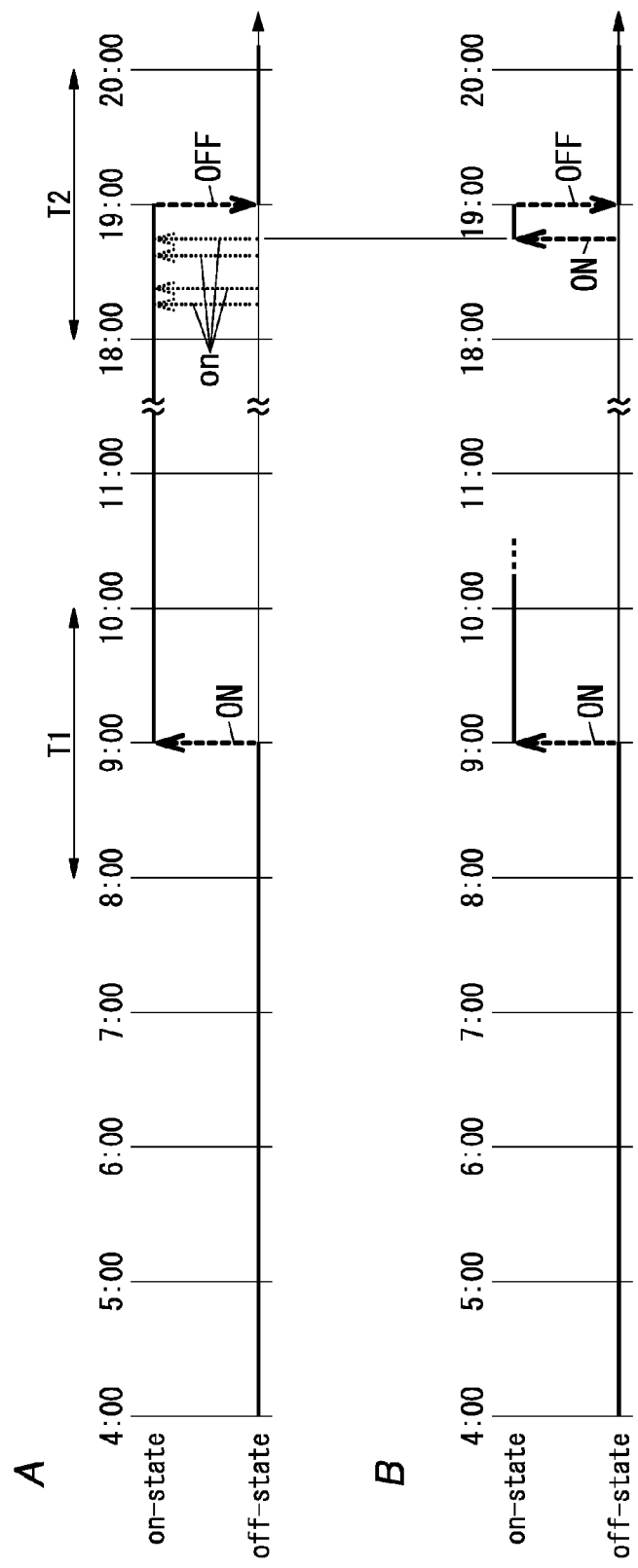
FIG. 15 is an explanatory view illustrating an operation example of the apparatus control device in accordance with the embodiment 1.
Figure 16:
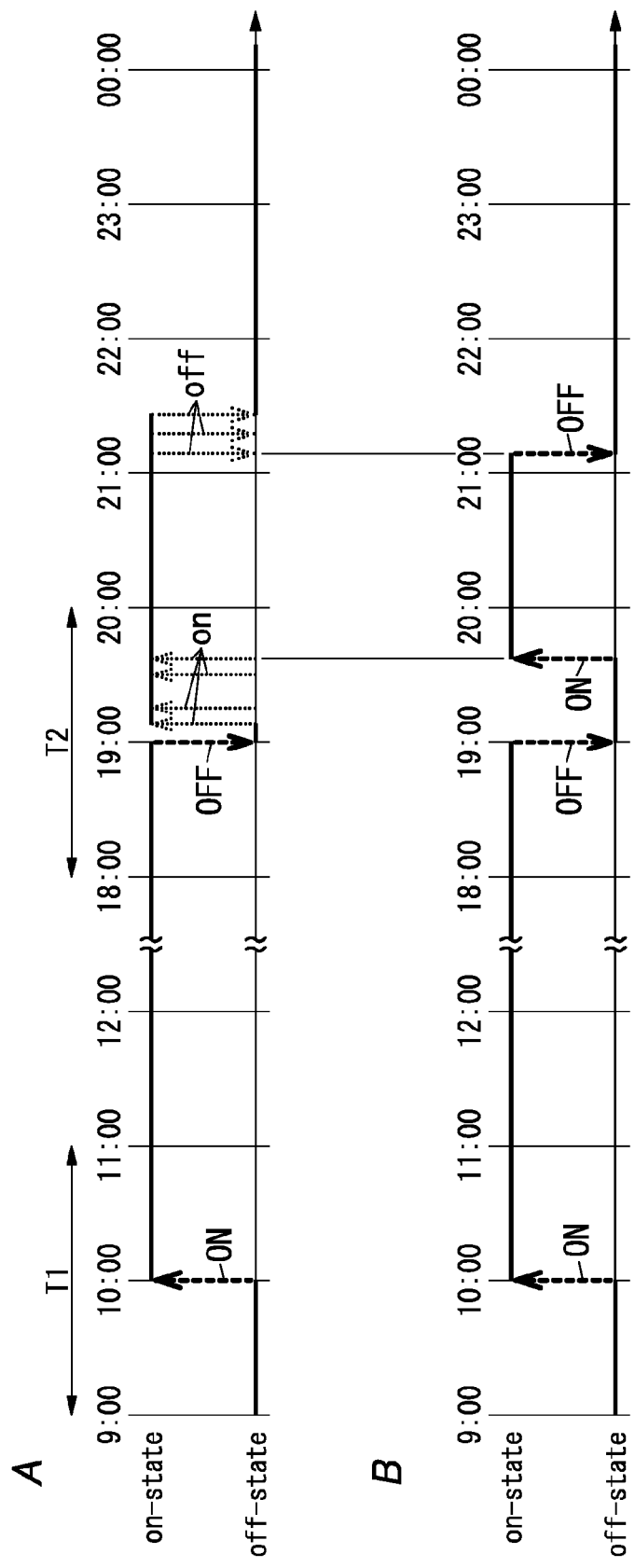
FIG. 16 is an explanatory view illustrating an operation example of the apparatus control device in accordance with the embodiment 1.
Figure 17:
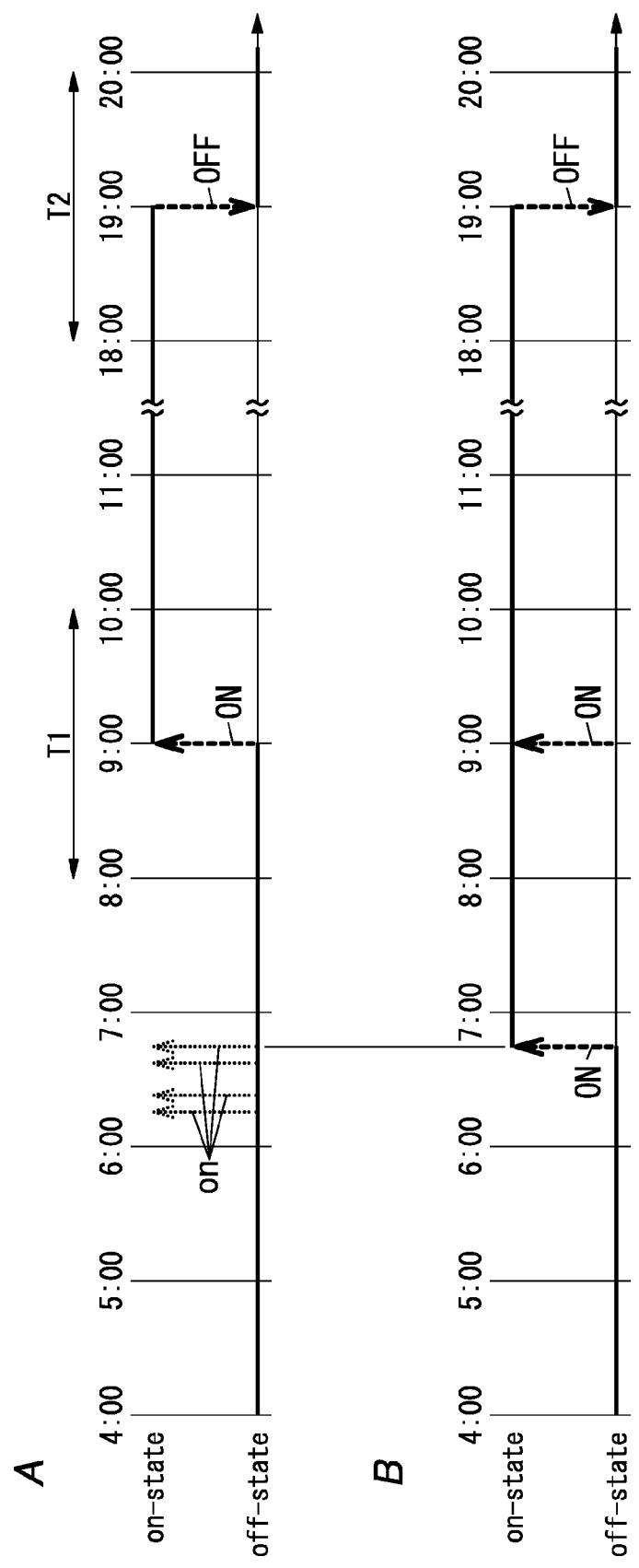
FIG. 17 is an explanatory view illustrating an operation example of the apparatus control device in accordance with the embodiment 1.

Next, concrete examples of the operation of the apparatus control device 1 with regard to the change process P4 are described briefly with reference to FIGS. 15 to 17.

In this regard, the control schedule is assumed to be set so that the on-control is performed on the intended apparatus 21 at 9:00 and the off-control is performed on the intended apparatus 21 at 19:00. Further, in the example shown in FIG. 16, the control schedule is assumed to be set so that the on-control is performed on the intended apparatus 21 at 10:00 instead of 9:00.

In the example designated by "A" in FIG. 15, with regard to the time period of 18:00-19:00 within the counting period, the number of times of on-manual-operation is four. In this case, the number of times of on-manual-operation in the time period of 18:00-19:00 is equal to the threshold or more (S9: Yes), and the basis of the determination period (18:00-20:00) T2 including this time period is the off-control (S10: Yes, S11: No). Further, the number of times of off-manual-operation in this time period is less than the threshold (S13: No).

Therefore, according to the change process P4, the control command defining the pair of the on-control and the control time indicative of 18:45 which is the latest obtaining time of the manual-operation information (the on-manual-operation) within the time period of 18:00-19:00, is newly added to the control schedule, as shown in FIG. 15 as "B".

In the example designated by "A" in FIG. 16, with regard to the time period of 19:00-20:00 within the counting period, the number of times of on-manual-operation is four. In this case, the number of times of on-manual-operation in the time period of 19:00-20:00 is equal to the threshold or more (S9: Yes), and the basis of the determination period (18:00-20:00) T2 including this time period is the off-control (S10: Yes, S11: No). Further, the number of times of off-manual-operation in this time period is less than the threshold (S13: No).

Therefore, according to the change process P4, the control command defining the pair of the on-control and the control time indicative of 19:35 which is the latest obtaining time of the manual-operation information (the on-manual-operation) within the time period of 19:00-20:00, is newly added to the control schedule, as shown in FIG. 16 as "B".

Additionally, in the example designated by "A" in FIG. 16, with regard to the time period of 21:00-22:00 within the counting period, the number of times of off-manual-operation is three. In this case, the number of times of off-manual-operation in the time period of 21:00-22:00 is equal to the threshold or more (S2: Yes). However, this time period is not included in any of the determination period (9:00-11:00) T1 on the basis of the on-control and the determination period T2 on the basis of the off-control (S3: No).

Therefore, according to the change process P3, the control command defining the pair of the off-control and the control time indicative of 21:10 which is the earliest obtaining time of the manual-operation information (the off-manual-operation) within the time period of 21:00-22:00, is newly added to the control schedule, as shown in FIG. 16 as "B".

Additionally, in the example designated by "A" in FIG. 17, with regard to the time period of 6:00-7:00 within the counting period, the number of times of on-manual-operation is four. In this case, the number of times of on-manual-operation in the time period of 6:00-7:00 is equal to the threshold or more (S9: Yes). However, this time period is not included in any of the determination period (8:00-10:00) T1 on the basis of the on-control and the determination period (18:00-20:00) T2 on the basis of the off-control (S10: No).

Therefore, according to the change process P4, the control command defining the pair of the on-control and the control time indicative of 6:45 which is the latest obtaining time of the manual-operation information (the on-manual-operation) within the time period of 6:00-7:00, is newly added to the control schedule, as shown in FIG. 17 as "B".

In the change processes P1, P2, P3, and P4, change and addition is "reserved". This is because the apparatus control device 1 tentatively decides (reserve) change of the control schedule (change of the control time and addition of the control command), and finally decides in response to reception of confirmation by the user. Accordingly, it is possible to prevent the user from misunderstanding automatic change of the control schedule by the apparatus control device 1, as malfunction of the apparatus control device 1.

In more detail, after performing tentative decision of the post-changed schedule in the change processes P1 to P4, the apparatus control device 1 presents a candidate of a post-changed control schedule by the schedule change unit 126, and finally decides change of the control schedule in response to reception of manual input from the user. For example, the apparatus control device 1 reports the tentatively decided (reserved) control schedule to the display terminal 5 or another display (e.g., a personal computer) by e-mail or the like and thereby inquires the user whether the change of this control schedule is allowed (S16). The user confirms the tentatively decided control schedule (i.e., a candidate of the post-changed control schedule) with the display terminal 5 or another display, and performs manual input indicative of whether the change of this control schedule is allowed.

The apparatus control device 1 determines to receive the manual input from the user indicative of allowance of the tentatively decided change to the control schedule, by the display terminal 5 or another display (S17). When change to the tentatively decided control schedule is allowed (S17: Yes), the apparatus control device 1 finally registers (definitely registers) the tentatively registered control schedule on the schedule storage unit 14 (S18), and ends the schedule change process regarding the intended time period. In this case, thereafter, the apparatus control device 1 controls the intended apparatus 21 in accordance with the post-changed control schedule. When change to the tentatively decided control schedule is refused (S17: No), the apparatus control device 1 discards the tentatively registered control schedule (S19), and ends the schedule change process regarding the intended time period.

As described above, in the apparatus control device 1 of the present embodiment, the schedule change unit 126 presents a candidate of a post-changed control schedule in a process of changing the control schedule, and finally decides change to this control schedule in response to manual input from a user.

According to the apparatus control device 1 of the present embodiment as described above, the control unit 12 includes the schedule change unit 126, and therefore it is possible to change the control schedule stored in the schedule storage unit 14 while the apparatus control device 1 is in operation. In more detail, when the number of times of obtaining the same type of the manual-operation information in the same time period is determined to be equal to the threshold or more by the determination unit 124, the schedule change unit 126 changes the control schedule on the basis of this manual-operation information. Therefore, the control schedule stored in the schedule change unit 126 is changed anytime on the basis of the manual-operation information indicative of the content of the manual-operation performed by the user.

In more detail, the apparatus control device 1 uses the control schedule common to multiple stores appropriately set by an engineer as a default, and the control schedule is automatically and gradually changed into a control schedule suitable for an individual store on the basis of the manual-operation performed actually by the user. Therefore, according to a control system including this apparatus control device 1, it is possible to provide a sufficient effect in a decrease in a consumption of resources (electricity) without using the control schedule set (adjusted) by an engineer in conformity with an individual store. In other words, in a case where in the default control schedule one apparatus consumes resources more than is necessary, when the user repeats the off-manual-operation on this apparatus, the apparatus control system reflects this off-manual-operation on the control schedule, and therefore the consumption of resources can be reduced.

Consequently, the apparatus control device 1 of the present embodiment can provide an advantageous effect that it is possible to realize decrease in a consumption of resources of an apparatus (i.e., saving energy) without imposing a great strain on an engineer.

Further, as described above, it is desirable that the determination unit 124 has a function of setting lengths of the multiple time periods used in determination. In other words, the determination unit 124 freely adjusts a range in a time axis for determining whether pieces of the manual-operation information obtained by the obtainment unit 122 are obtained in the same time period. In other words, increase in the length of the time period used in the determination may cause increase in the number of pieces of the same type of the manual-operation information obtained in the same time period in the determination performed by the determination unit 124. Consequently, the manual-operation by the user is more easily reflected on the control schedule.

Further, as described above, it is desirable that, when the number of times of obtaining the same type of the manual-operation information within the same time period is determined to be equal to the threshold or more by the determination unit 124 and when this time period is included in the monitoring period, the schedule change unit 126 changes the control time as the basis of this monitoring period, in accordance with the manual-operation information. The monitoring period is defined as a period decided on the basis of the control time associated with the control content of the same type as this manual-operation information whose number of times of obtaining is determined to be equal to the threshold or more by the determination unit 124, so as to be constituted by at least one of predetermined time periods prior to and subsequent to this control time. Accordingly, the apparatus control device 1 can finely modify the prepared control schedule in accordance with the actual manual-operation history of the user.

Further, as described above, it is desirable that, when the number of times of obtaining the same type of the manual-operation information within the same time period is determined to be equal to the threshold or more by the determination unit 124 and when this time period is not included in the monitoring period, the schedule change unit 126 adds a new control command to the control schedule on the basis of the manual-operation information. Accordingly, the apparatus control device 1 can add the new control command to the prepared control schedule in accordance with the actual manual-operation history of the user.

Further, it is desirable that, when, with regard to two or more types of the manual-operation information, the number of times of obtaining the same type of manual-operation information within the same time period is determined to be equal to the predetermined threshold or more by the determination unit 124, the schedule change unit 126 selects the manual-operation information used for the change of the control schedule in the following manner. It is desirable that the schedule change unit 126 uses preferentially the manual-operation information of the same type as the control content associated with the control time used as the basis of the monitoring period, for change of the control schedule. Accordingly, in an example where both the on-manual-operation and the off-manual-operation was performed around the time associated with the control command of the off-control on the control schedule, the off-manual-operation which is of the same type as the control command is used for the change of the control schedule preferentially. Consequently, the schedule change unit 126 can change the control schedule so as to reflect the original control schedule as possible.

Furthermore, as described above, it is desirable that, when the number of times of obtaining the same type of the manual-operation information within the same time period is determined to be equal to the predetermined threshold or more by the determination unit 124, the schedule change unit 126 changes the control schedule on the basis of the manual-operation information selected in the following manner. That is, the schedule change unit 126 changes the control schedule on the basis of the manual-operation information obtained at a time which is the smallest in a consumption of the resources of times at which pieces of the same type of the manual-operation information are obtained. Accordingly, the apparatus control device 1 can automatically change the prepared control schedule during operation and nevertheless achieve energy saving.

Further, as described above, it is desirable that the apparatus control device 1 further includes the cost conversion unit 127 configured to convert a consumption of the resources into a cost and the display output unit 11. The display output unit 11 displays at least one of the consumption of the resources in a case where the intended apparatus such as the intended apparatuses 21, 22, and 23 is controlled in accordance with the control schedule, and the cost obtained into which the consumption is converted by the cost conversion unit 127. Accordingly, the apparatus control device 1 can report the consumption of the resources of the apparatus controlled in accordance with the control schedule to the user. Additionally, the apparatus control device 1 converts the consumption of the resources into the cost easily comprehensible by the user, and therefore can present the effects of the energy saving to the user in an easy-to-understand manner. Further, when the schedule change unit 126 changes the control schedule, the apparatus control device 1 can clearly show what degree of effects on the consumption of the resources (or the cost) caused by the change of the control schedule.

Further, as described above, it is desirable that the schedule change unit 126 is configured to present a candidate of a post-changed control schedule in a process of changing the control schedule, and to finally decide change to this control schedule in response to manual input from a user. Accordingly, it is possible to avoid an unwanted situation in which the apparatus control device 1 changes the control schedule without user's permission. Therefore, it can be possible to prevent occurrence of a situation in which the control schedule is changed without user's permission and the user misunderstands such change as malfunction of the apparatus control device 1.

Additionally, it is desirable that the determination unit 124 uses different values as the threshold according to different types of the manual-operation information and a value of the threshold corresponding to the manual-operation information for decreasing a consumption of the resources is lower than a value of the threshold corresponding to the manual-operation information for increasing a consumption of the resources. In other words, the determination unit 124 may change the threshold used in determination in accordance with the type of the manual-operation information. For example, when the first threshold used in determination of the number of times of on-manual-operation and the second threshold used in determination of the number of times of off-manual-operation are different values, it is desirable that both thresholds fulfill the following relation.

That is, the on-manual-operation is the manual-operation information causing increase in the consumption of resources, and the off-manual-operation is the manual-operation information causing decrease in the consumption of resources. Therefore, the second threshold regarding the off-manual-operation is set to be lower than the first threshold regarding the on-manual-operation.

Accordingly, the schedule change unit 126 uses the manual-operation information causing decrease in the consumption of resources in priority to the manual-operation information causing increase in the consumption of resources, for change of the control schedule. Consequently, the apparatus control device 1 can automatically change the prepared control schedule during operation and nevertheless achieve energy saving.

Embodiment 2

An apparatus control device 1 of the present embodiment is different from the apparatus control device 1 of the embodiment 1 in that change of the operation-state which the apparatus control device 1 can identify includes increase and decrease in a dimming level in a case of an intended apparatus 21 serving as a lighting fixture, and increase and decrease in a desired temperature in a case of an intended apparatus 22 serving as an air conditioner. Hereinafter, components of the present embodiment which are the same as those of the embodiment 1 are designated by the same reference sings as the embodiment 1 and their explanations are omitted.

In the present embodiment, the patterns of control by the apparatus control device 1 may include increase and decrease in the dimming level in a case of the intended apparatus 21 serving as the lighting fixture, and increase and decrease in the desired temperature in a case of the intended apparatus 22 serving as the air conditioner, in addition to on-control and off-control, for example. Hereinafter, control relating to increase and decrease in the dimming level of the lighting fixture is referred to as "dimming control", and control relating to increase and decrease in the dimming level of the air conditioner is referred to as "temperature control".

In the present embodiment, an identification unit 123 identifies types of pieces of manual-operation information for the same intended apparatus 21, 22, or 23 as being different when the patterns of control (e.g., on-control, off-control, increase in the dimming level, decrease in the dimming level, increase in the desired temperature, and decrease in the desired temperature) thereof are different. Note that, the identification unit 123 may identify a degree of the dimming control or the temperature control (amounts of increase and decrease) and determine that pieces of the manual-operation information are of the same type when the degrees of the dimming control or the temperature control of these pieces of the manual-operation information are equal. Alternatively, the identification unit 123 may not identify the degree of the dimming control or the temperature control, but may determine which one of the increase in the dimming level, the decrease in the dimming level, the increase in the desired temperature, and the decrease in the desired temperature the type of the manual-operation information is.

In the following example, the identification unit 123 does not identify the degree of the dimming control or the temperature control. In more detail, for example with regard to the intended apparatus 22 serving as the air conditioner, the identification unit 123 classifies manual-operation of increasing the desired temperature by 1° C. and manual-operation of increasing the desired temperature by 2° C. into the same type of the manual-operation information.

Next, concrete examples of the operation of the apparatus control device 1 with regard to change of the control schedule are described briefly with reference to FIGS. 18 to 21. The following description relates to an operation of the apparatus control device 1 of changing the control schedule of the intended apparatus 22 in a case where this intended apparatus 22 serving as the air conditioner operates as a cooler in summer time. Note that, in FIGS. 18 to 21, the vertical axis indicates the desired temperature, and "A" designates an example of the pre-changed control schedule, and "B" designates an example of the post-changed control schedule, and "ON" means the on-control on the control schedule, and "CN" means the temperature control on the control schedule, and "OP" means the temperature control caused by the manual-operation by the user.

In this regard, the control schedule is assumed to be set so that the on-control (the desired temperature of 27° C.) is performed on the intended apparatus 22 at 11:00 and the temperature control of increasing the desired temperature by 1° C. (i.e., setting the desired temperature to 28° C.) is performed on the intended apparatus 22 at 14:00.

Figure 18:
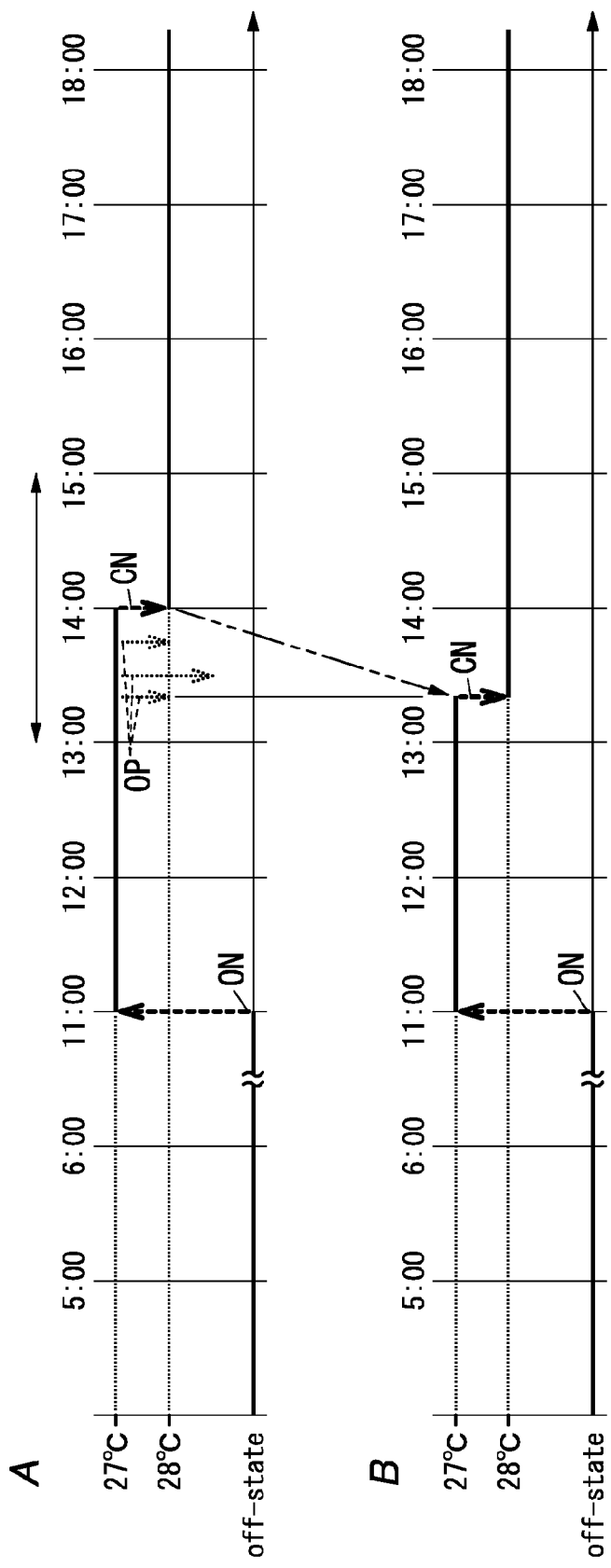
FIG. 18 is an explanatory view illustrating an operation example of the apparatus control device in accordance with the embodiment 2.

In the example designated by "A" in FIG. 18, the manual-operation of increasing the desired temperature of the intended apparatus 22 is performed by the user at 13:25 on November 4, at 13:30 on November 5, and at 13:50 on November 6 which are included in the counting period. The manual-operation at 13:25 on November 4 and the manual-operation at 13:50 on November 6 are manual-operation of increasing the desired temperature by 1° C., and the manual-operation at 13:30 on November 5 is manual-operation of increasing the desired temperature by 2° C. In this example, a determination unit 124 determines that the number of times of the same type of the manual-operation information (manual-operation of increasing the desired temperature) within the time period of 13:00-14:00 is equal to a threshold (3) or more. Further, this time period (13:00-14:00) is included in a monitoring period (13:00-15:00) decided on the basis of a control time associated with a control content (the increase in the desired temperature) of the same type as the above manual-operation information.

Therefore, a schedule change unit 126 changes the control time as the basis for this monitoring period on the basis of the manual-operation information. Therefore, in the control schedule, the control time of the control command of the temperature control which is originally set to 14:00 is shifted to 13:25 which is the earliest obtaining time of the manual-operation information (the manual-operation of increasing the desired temperature) within the time period of 13:00-14:00, as shown in FIG. 18 as "B". Note that, in the example indicated by "B" in FIG. 18, the control content of the control command whose control time is set to 13:25 in the post-changed control schedule is the temperature control of increasing the desired temperature by 1° C. as with the control content of the control command whose control time is originally set to 14:00.

Figure 19:
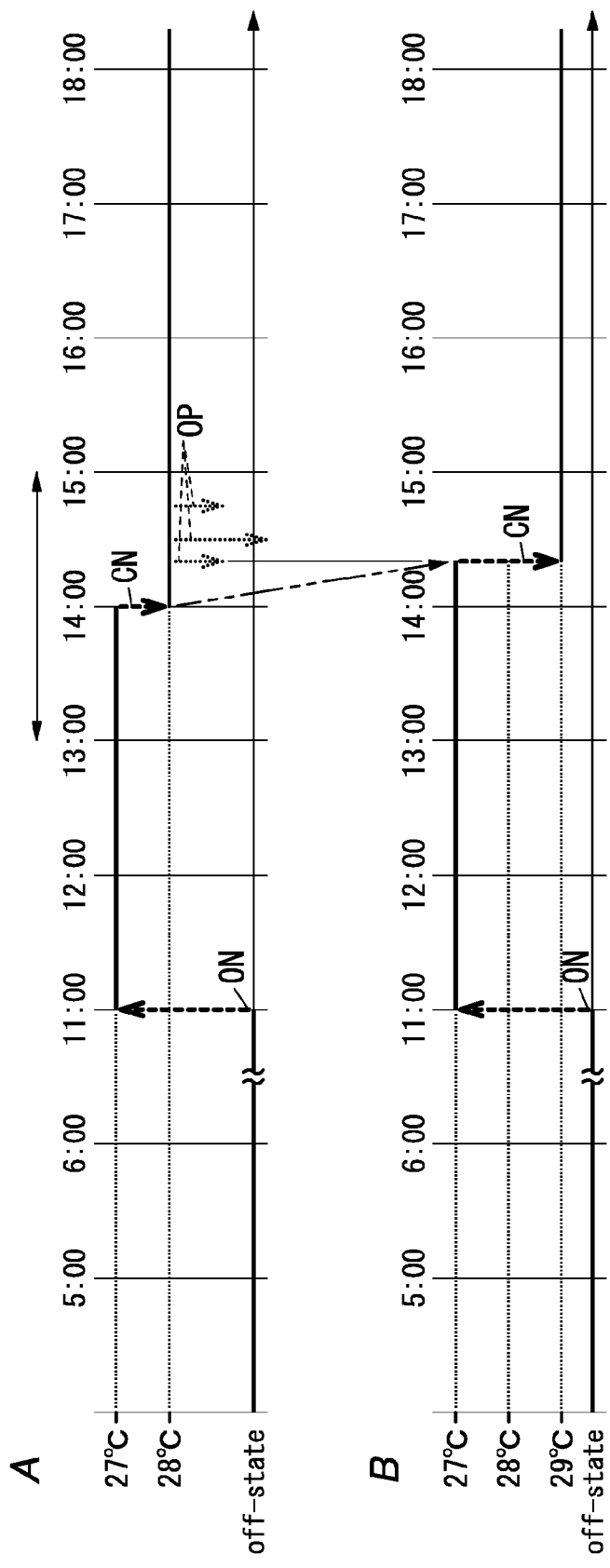
FIG. 19 is an explanatory view illustrating an operation example of an apparatus control device in accordance with the embodiment 2.

In the example designated by "A" in FIG. 19, the manual-operation of increasing the desired temperature of the intended apparatus 22 is performed by the user at 14:25 on November 4, at 14:30 on November 5, and at 14:50 on November 6 which are included in the counting period. The manual-operation at 14:25 on November 4 and the manual-operation at 14:50 on November 6 are manual-operation of increasing the desired temperature by 1° C., and the manual-operation at 14:30 on November 5 is manual-operation of increasing the desired temperature by 2° C. In this example, the determination unit 124 determines that the number of times of the same type of the manual-operation information (manual-operation of increasing the desired temperature) within the time period of 14:00-15:00 is equal to the threshold (3) or more. Further, this time period (14:00-15:00) is included in the monitoring period (13:00-15:00) decided on the basis of the control time associated with the control content (the increase in the desired temperature) of the same type as the above manual-operation information.

Therefore, the schedule change unit 126 changes the control time as the basis for this monitoring period on the basis of the manual-operation information. Therefore, in the control schedule, the control time of the control command of the temperature control which is originally set to 14:00 is shifted to 14:25 which is the earliest obtaining time of the manual-operation information (the manual-operation of increasing the desired temperature) within the time period of 14:00-15:00, as shown in FIG. 19 as "B". Note that, in the example indicated by "B" in FIG. 19, the control content of the control command whose control time is set to 14:25 in the post-changed control schedule includes the temperature control of increasing the desired temperature by 1° C. in addition to the control content (the temperature control of increasing the desired temperature by 1° C.) of the control command whose control time is originally set to 14:00. In other words, the control content of the control command whose control time is set to 14:25 in the post-changed control schedule is the temperature control of increasing the desired temperature by 2° C.

In the example designated by "A" in FIG. 20, the manual-operation of decreasing the desired temperature of the intended apparatus 22 is performed by the user at 13:25 on November 4, at 13:30 on November 5, and at 13:50 on November 6 which are included in the counting period. The manual-operation at 13:25 on November 4 and the manual-operation at 13:50 on November 6 are manual-operation of decreasing the desired temperature by 1° C., and the manual-operation at 13:30 on November 5 is manual-operation of decreasing the desired temperature by 2° C. In this example, the determination unit 124 determines that the number of times of the same type of the manual-operation information (manual-operation of decreasing the desired temperature) within the time period of 13:00-14:00 is equal to the threshold (3) or more. Further, this time period (13:00-14:00) is not included in the monitoring period decided on the basis of the control time associated with the control content (the decrease in the desired temperature) of the same type as the above manual-operation information.

Therefore, the schedule change unit 126 adds a new control command to the control schedule on the basis of the manual-operation information. Therefore, as shown in FIG. 20 as "B", the control command defining the pair of the temperature control and the control time indicative of 13:50 which is the latest obtaining time of the manual-operation information (manual-operation of decreasing the desired temperature) within the time period of 13:00-14:00, is newly added to the control schedule. In this regard, in the example indicated by "B" in FIG. 20, the control content of the newly added control command whose control time is 13:50 in the post-changed control schedule is the temperature control of decreasing the desired temperature by 1° C. Note that, in the example indicated by "B" in FIG. 20, the control command (the temperature control of increasing the desired temperature by 1° C.) whose control time is originally set to 14:00 is deleted.

In the example designated by "A" in FIG. 21, the manual-operation of decreasing the desired temperature of the intended apparatus 22 is performed by the user at 14:25 on November 4, at 14:30 on November 5, and at 14:50 on November 6 which are included in the counting period. The manual-operation at 14:25 on November 4 and the manual-operation at 14:50 on November 6 are manual-operation of decreasing the desired temperature by 1° C., and the manual-operation at 14:30 on November 5 is manual-operation of decreasing the desired temperature by 2° C. In this example, the determination unit 124 determines that the number of times of the same type of the manual-operation information (manual-operation of decreasing the desired temperature) within the time period of 14:00-15:00 is equal to the threshold (3) or more. Further, this time period (14:00-15:00) is not included in the monitoring period decided on the basis of the control time associated with the control content (the decrease in the desired temperature) of the same type as the above manual-operation information.

Therefore, the schedule change unit 126 adds a new control command to the control schedule on the basis of the manual-operation information. However, in the example designated by "B" in FIG. 21, the control command regarding the temperature control whose control time is originally set to 14:00 and the newly-added control command define contrary control contents (the increase and the decrease in the desired temperature), and therefore these control commands cancel with each other. As a result, as shown in FIG. 21 as "B", the control command regarding the temperature control whose control time is originally set to 14:00 is deleted.

Further, the examples shown in FIGS. 18 and 20, irrespective of the degree (increase and decrease amounts) of the temperature control in the manual-operation information, each of the control contents of the control commands which are changed or added indicates temperature control based on the fixed increase or decrease amounts of 1° C. In the process of changing the control schedule with regard to the dimming control and the temperature control, the increase and decrease amounts of the control command which is changed or added is decreased as possible, and therefore it is possible to suppress uncomfortable feeling given to the user caused by the change of the control schedule.

According to the apparatus control device 1 of the present embodiment as described above, the control schedule can include the dimming control of the lighting fixture and the temperature control of the air conditioner. Further, when the user conducts manual-operation to change the lighting level of the lighting fixture and the desired temperature of the air conditioner, the apparatus control device 1 can change the control schedule on the basis of such manual-operation information.

For example, in a case where the control schedule is set suitable for summer time, when an outside air temperature may be low unexpectedly due to cold summer, the user may conduct manual-operation to increase the desired temperature of the air conditioner. In such a case, the apparatus control device 1 can automatically change the control schedule so as to reflect the manual-operation by the user. Consequently, it is possible to reduce the consumption of the resources of the apparatus, that is, to achieve energy saving.

In contrast, as a result of controlling the air conditioner in accordance with the control schedule by the apparatus control device 1, the user may feel somewhat uncomfortable. In such a case, the user may conduct manual-operation to increase the desired temperature of the air conditioner. In this case, the apparatus control device 1 can automatically change the control schedule so as to reflect the manual-operation by the user. Consequently, it is possible to ensure comfort of the user.

Components and functions of the present embodiment which are not described above are the same as those of the embodiment 1.

The invention claimed is:

1. A method for controlling apparatus for controlling an operation of an intended apparatus in accordance with a control schedule, the method comprising:

storing, in a storage unit, a control schedule including multiple control commands each defining a pair of a control time and a control content, the control time and the control content being associated with each other;

controlling an intended apparatus at a control time used in the control schedule stored in the schedule storage unit, in accordance with the control content associated with the control time;

obtaining, within a counting period equal to or more than two days, manual-operation information indicative of a control content of a manual-operation conducted by a user and a time at which the manual-operation is conducted with regard to control on the intended apparatus;

counting the number of times of a specific manual operation conducted by the user based on the manual-operation information within the counting period equal to or more than two days, for each of multiple time periods into which a day is divided;

determining whether the number of times of the specific manual operation for the time periods is equal to or more than a predetermined threshold;

after determining that the number of times of the specific manual operation in a given time period is equal to or more than the predetermined threshold, identifying a control command, in the given time period, having the same control content type as a control content of the specific manual operation;

setting, as a determination period, a monitoring period based on the control schedule, the monitoring period being constituted by at least one of predetermined time periods prior to and subsequent to the control time in the control schedule corresponding to the identified control command;

determining whether or not the given time period is included in the monitoring period, and after determining that the given time period is included in the monitoring period, changing the control time in the control schedule corresponding to the identified control command based on manual-operation information corresponding to the given time period.

2. An apparatus control device for controlling an operation of an intended apparatus in accordance with a control schedule, which consumes resources to operate, the apparatus control device comprising:

a schedule storage unit configured to store a control schedule including multiple control commands each defining a pair of a control time and a control content, the control time and the control content being associated with each other;

an execution unit configured to control the intended apparatus, at a control time defined in the control schedule stored in the schedule storage unit, in accordance with the control content associated with the control time;

an obtainment unit configured to obtain, within a counting period equal to or more than two days, manual-operation information indicative of a control content of a manual-operation conducted by a user and a time at which the manual-operation is conducted with regard to control on the intended apparatus;

a first determination unit configured to:
count the number of times of a specific manual operation conducted by the user based on the manual-operation information within the counting period equal to or more than two days, for each of multiple time periods into which a day is divided, and
determine whether the number of times of the specific manual operation for the time periods is equal to or more than a predetermined threshold;

a schedule change unit configured to:
when the number of times of the specific manual operation in a given time period is equal to or more than the predetermined threshold, identify a control command, in the given time period, having the same control content type as a control content of the specific manual operation; and a second determination unit configured to:
set, as a determination period, a monitoring period based on the control schedule, the monitoring period being constituted by at least one of predetermined time periods prior to and subsequent to the control time in the control schedule corresponding to the identified control command; and
determine whether or not the given time period is included in the monitoring period, wherein the schedule change unit is further configured to, when the given time period is included in the monitoring period, change the control time in the control schedule corresponding to the identified control command based on manual-operation information corresponding to the given time period.

3. The apparatus control device according to claim 2, wherein the schedule change unit is configured to,
when the given time period is included in the monitoring period, change the control time based on a content of manual-operation information which is obtained at a time which results in a smallest consumption of the resources.

4. The apparatus control device according to claim 2, wherein:
the first determination unit is configured to use different values as the threshold for two or more specific manual operations, and
a value of the threshold for a first manual operation is lower than a value of the threshold for a second manual operation, the first manual operation being for decreasing a consumption of the resources and the second manual operation being for increasing a consumption of the resources.

5. The apparatus control device according to claim 2, further comprising:
a cost conversion unit configured to convert a consumption of the resources into a cost; and
a display output unit configured to display at least one of the consumption of the resources in a case where the intended apparatus is controlled in accordance with the control schedule, and the cost obtained into which the consumption is converted by the cost conversion unit.

6. The apparatus control device according to claim 2, wherein
the schedule change unit is configured to present a candidate of a post-changed control schedule in a process of changing the control schedule, and to finally decide change to the control schedule in response to manual input from a user.

7. An apparatus control system for controlling operation of multiple intended apparatuses in accordance with a control schedule, the apparatus control system comprising:

the apparatus control device according to claim 2; and multiple intended apparatuses, each of which corresponds to the intended apparatus, wherein the execution unit is configured to control operations of the multiple intended apparatuses.

8. The apparatus control device according to claim 2, wherein the first determination unit has a function of setting lengths of the multiple time periods.

9. An apparatus control device for controlling an operation of an intended apparatus in accordance with a control schedule, which consumes resources to operate, the apparatus control device comprising:

a schedule storage unit configured to store a control schedule including multiple control commands each defining a pair of a control time and a control content, the control time and the control content being associated with each other;

an execution unit configured to control the intended apparatus, at a control time defined in the control schedule stored in the schedule storage unit, in accordance with the control content associated with the control time;

an obtainment unit configured to obtain, within a counting period equal to or more than two days, manual-operation information indicative of a control content of a manual-operation conducted by a user and a time at which the manual-operation is conducted with regard to control on the intended apparatus;

a first determination unit configured to:

count the number of times of a specific manual operation conducted by the user based on the manual-operation information within the counting period equal to or more than two days, for each of multiple time periods into which a day is divided, and determine whether the number of times of the specific manual operation for the time periods is equal to or more than a predetermined threshold;

a schedule change unit configured to:

when the number of times of the specific manual operation in a given time period is equal to or more than the predetermined threshold, identify a control command, in the given time period, having the same control content type as a control content of the specific manual operation; and a second determination unit configured to:

set, as a determination period, a monitoring period based on the control schedule, the monitoring period being constituted by at least one of predetermined time periods prior to and subsequent to the control time in the control schedule corresponding to the identified control command; and determine whether or not the given time period is included in the monitoring period, wherein the schedule change unit is further configured to, when the given time period is not included in the monitoring period, add a new control command to the control schedule based on manual-operation information corresponding to the given time period.

10. The apparatus control device according to claim 9, wherein the first determination unit has a function of setting lengths of the multiple time periods.

11. The apparatus control device according to claim 9, wherein the schedule change unit is configured to, when the given time period is included in the monitoring period, change the control time based on a content of manual-operation information which is obtained at a time which results in a smallest consumption of the resources.

12. The apparatus control device according to claim 9, wherein:

the first determination unit is configured to use different values as the threshold for two or more specific manual operations, and a value of the threshold for a first manual operation is lower than a value of the threshold for a second manual operation, the first manual operation being for decreasing a consumption of the resources and the second manual operation being for increasing a consumption of the resources.

13. The apparatus control device according to claim 9, further comprising:

a cost conversion unit configured to convert a consumption of the resources into a cost; and a display output unit configured to display at least one of the consumption of the resources in a case where the intended apparatus is controlled in accordance with the control schedule, and the cost obtained into which the consumption is converted by the cost conversion unit.

14. The apparatus control device according to claim 9, wherein the schedule change unit is configured to present a candidate of a post-changed control schedule in a process of changing the control schedule, and to finally decide change to the control schedule in response to manual input from a user.

15. An apparatus control system for controlling operations of multiple intended apparatuses in accordance with a control schedule comprising:

the apparatus control device according to claim 9; and multiple intended apparatuses, each of which corresponds to the intended apparatus, wherein the execution unit is configured to control operations of the multiple intended apparatuses.

\* \* \* \* \*